United States Patent [19]

Toriumi et al.

[11] 4,278,346
[45] Jul. 14, 1981

[54] READING AND PRINTING APPARATUS

[75] Inventors: Shiro Toriumi, Zama; Takao Saijo, Matsudo; Hiroshi Endo, Fuchu; Kuniaki Kamimura, Kawasaki; Takanori Saito, Musashino, all of Japan

[73] Assignee: Minolta Camera Kabushiki Kaisha, Osaka, Japan

[21] Appl. No.: 52,916

[22] Filed: Jun. 26, 1979

[30] Foreign Application Priority Data

| Jul. 1, 1978 | [JP] | Japan | 53/80200 |
| Jul. 1, 1978 | [JP] | Japan | 53/80201 |
| Jul. 7, 1978 | [JP] | Japan | 53/83289 |
| Jan. 19, 1979 | [JP] | Japan | 54/5884 |

[51] Int. Cl.³ .............................................. G03B 13/28
[52] U.S. Cl. ......................................... 355/45; 271/69; 355/5
[58] Field of Search ..................... 355/5, 45, 50, 14 R; 271/69

[56] References Cited

U.S. PATENT DOCUMENTS

| 3,078,770 | 2/1963 | Hunt et al. | 355/14 R |
| 3,094,036 | 6/1963 | Benson | 355/45 X |
| 3,578,317 | 5/1971 | Burnham | 271/69 |
| 3,988,064 | 10/1976 | Sone et al. | 355/45 X |
| 4,043,661 | 8/1977 | Yamada et al. | 355/50 |

Primary Examiner—Richard A. Wintercorn
Attorney, Agent, or Firm—Wenderoth, Lind & Ponack

[57] ABSTRACT

The disclosure relates to an improved reading and printing apparatus which includes a carrier for holding a film in a flat state, a first positioning device for positioning the carrier at a screen projecting position for projecting the image of the film onto an observation screen, a second positioning device for positioning the carrier at a scanning starting position for scanning and exposing the image of the film, and a scanning device for scanning the carrier from the scanning starting position. By the above arrangement, the functions as the reader and printer are incorporated into the apparatus of compact size through elimination of wasteful space and time involved in the scanning of the carrier.

11 Claims, 33 Drawing Figures

Fig. 1
Fig. 2
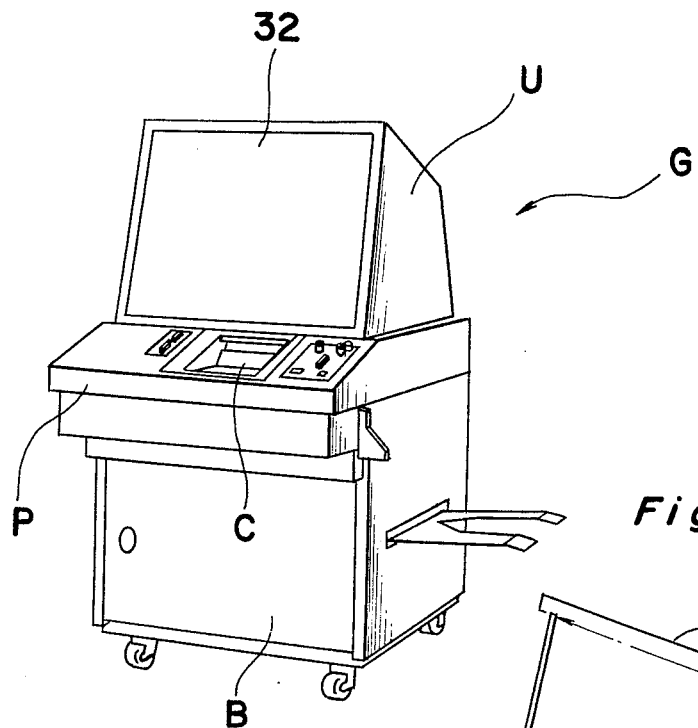
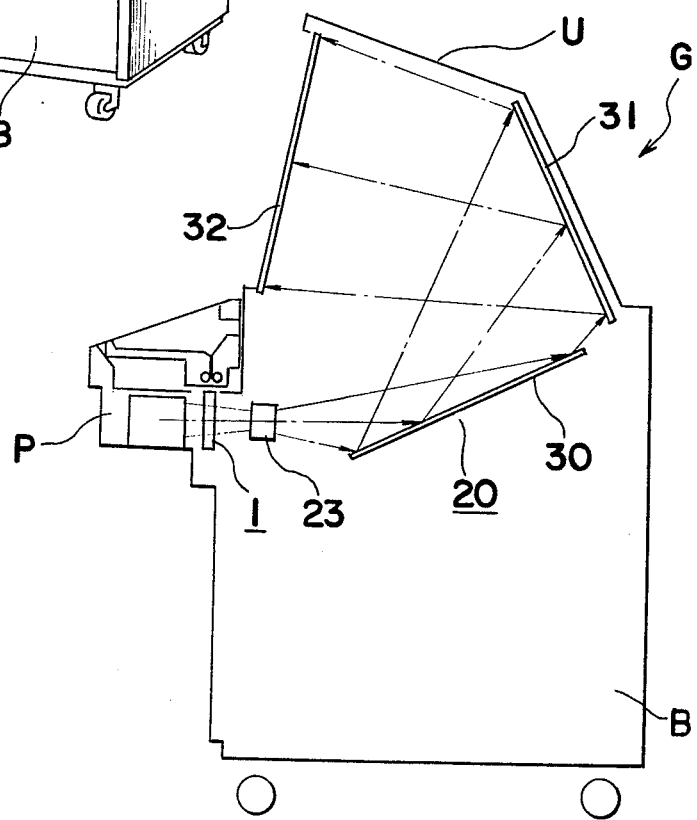

READING AND PRINTING APPARATUS

BACKGROUND OF THE INVENTION

The present invention relates to a reading and printing apparatus or reader-printer for microfilm and the like and more particularly relates to a reader-printer having the functions for directing a light image of information contained on the microfilm selectively onto an observation screen or onto a photosensitive member by scanning for copying thereof.

Generally, in a reader-printer of the above described type, it is necessary to cause reflecting mirrors for projecting the light image onto the observation screen and onto the photosensitive member or photoreceptor selectively to enter or withdraw from the light path through a projecting lens when the projection of the light image is changed over from the observation screen onto the photoreceptor or vice versa, and if the space for such withdrawal is taken into account, the size of the reader-printer itself becomes quite large, thus resulting in some cases in turbulence or blur in the copied images arising from positional deviations and vibrations following advancing and retracting movements of the respective reflecting mirrors. similarly, when the images to be projected onto the screen are large, the light path for the projection onto the screen also becomes large, with consequent increase in the size of the apparatus.

Furthermore, in the reader-printer as described above which is generally a combination of an optical system for selectively directing the image information from a film in an aperture card, etc. onto the observation screeen or photosensitive member, and a copying device for printing, if a photosensitive member of the drum type is employed for slit exposure, it is necessary to provide a scanning device for causing a carrier holding the aperture card to scan in synchronization with the circumferential speed of the photosensitive drum. In the arrangement as described above wherein the carrier is caused to scan, it is necessary to position the carrier so that, with respect to the optical axis of a projecting lamp of the optical system, the central portion of the image is aligned during the functioning as a reader and the edge of the image in the scanning direction is aligned during the functioning as a printer for causing the carrier to start the scanning from such position. For varying the relative position between the optical axis of the optical system and the image in the functioning as the reader and in the starting of the scanning during functioning as the printer, an arrangement for changing-over of the position of the optical system itself or changing-over of the position of the carrier itself can be used, but in the former arrangement, alteration of the optical system, especially alteration of the light path from the projecting lamp thereof to the projecting lens requires special moving means, with consequent complication and increase in size of the reader-printer, while an extra space for scanning the carrier is also required, so that the arrangement is suitable for practical application. Meanwhile, in the latter arrangement in which the carrier is moved to the scanning starting position during functioning as the printer, the driving system such as a return spring or the like normally provided in the scanning device may be utilized as a moving means therefor, and moreover, space for allowing the carrier to scan may be provided for efficient operation, thus bringing about the advantage that the apparatus itself is not unnecessarily complicated or made large. However, even when the latter arrangement as described above is adopted, it is required to position the carrier by forcibly causing the carrier to contact positioning members provided at respective positions for projecting the image onto the observation screen upon termination of the returning of the carrier or at a scanning starting position for scanning and exposing the photoreceptor, and thus, it becomes necessary to consider improvements in durability and accuracy of the arrangement by preventing generation of noises and vibrations by absorption of impacts at the time of the contact between the carrier and the positioning members. Furthermore, since the sizes of the images in the aperture cards are normally different, the sizes of the copied images are not the same even if the projecting magnification of the optical system is constant. Therefore, if the scanning starting position is the same for images of different sizes, time is wasted during the scanning. For eliminating such waste of time, it is also necessary to take into account means for selective positioning of the scanning starting position of the carrier so as to correspond to the sizes of the copied images.

Moreover, in a scanning device to which driving force is normally transmitted from a driving mechanism equipped with a main motor, errors in the revolutions to be transmitted to the scanning device tend to take place due to deviations in the focal length and light path length of the projecting lens or deviations in the processing accuracy of pulleys, gears, etc. for the transmission, and therefore, it is required to correct such errors. Moreover, for eliminating waste of time for scanning, it is necessary to control the distance of the scanning so that it corresponds with the size of the image to be copied instead of making the scanning distance of the carrier constant at all times. Normally, for the detection of the terminating position of the scanning corresponding to the sizes of the copied images, displacement of the carrier during the scanning is directly detected, but in the reader-printer as described in the foregoing, since the original, i.e. the image in the aperture card, is extremely small as compared with originals employed in ordinary copying apparatuses, the scanning distance of the carrier is inevitably reduced, and directly detecting such a short distance, i.e. the small amount of displacement of the carrier, may result in large errors, with fine adjustments of a detector (detecting position) and the like being made extremely difficult.

Furthermore, in the reader-printer and the like as described in the foregoing there is a tendency that the center of the image in the film, the optical axis of the projecting lens and the center of the observation screen are not perfectly aligned, with deviation therebetween being due to errors in the amounts of roll films fed, microfiche films, faulty positioning of the aperture cards, deviations in the film positions in the aperture cards, etc., thus resulting in such inconveniences that the projected image is shifted to one side of the observation screen or part of the projected image is not on the observation screen. Upon occurrence of the deviations as described above, it is necessary to make manual fine adjustments of the positions of the films or aperture cards. However, in an apparatus equipped with an automatic feeding device for automatically feeding the film and stopping a predetermined frame at the projecting position, for effecting the manual feeding and adjustment as described above, it is required that the automatic feeding device and manual feeding device be respectively driven without any adverse effect therebetween, and thus, the apparatus becomes undesirably complicated both in construction ans function. On the other hand, in a reader-printer in which scanning and exposure are effected while the aperture card is moved, since a positioning member for the aperture card is provided in the inner portion of the reader-printer or arranged to be moved together with the aperture card, not only does deviation of the film positions take place, but it is difficult to adjust the positioning member so as to correct for the deviation in the film positions or to deal with aperture cards other than standard cards.

SUMMARY OF THE INVENTION

Accordingly, an essential object of the present invention is to provide an improved reading and printing apparatus in which compact means is provided by which the functions as a reader and a printer are carried out, yet the size of the apparatus is reduced, and accurate and smooth movements of respective component elements during operation are achieved.

Another important object of the present invention is to provide a reading and printing apparatus of the above described type in which wasted time and space involved in the scanning of a carrier is eliminated, and the scanning starting position of the carrier is arranged to be selectively determined according to the sizes of the images to be copied, with errors in revolutions to be transmitted to the scanning device being corrected by adjusting means, while the scanning position can be detected with high accuracy, and impacts at the termination of returning of the carrier being advantageously absorbed.

A further object of the present invention is to provide a reading and printing apparatus of the above described type equipped with an adjusting device for adjusting the positions of projected images which has a simple structure and is efficient in operation.

A still further object of the present invention is to provide a reading and printing apparatus of the above described type which functions stably and accurately and which can be manufactured at comparatively low cost.

In accomplishing these and other objects, according to one preferred embodiment of the present invention, there is provided a reading and printing apparatus which can function as a reader for projecting image information contained on a film onto an observation screen and can also function as a printer for scanning and projecting the image information onto a photosensitive member, which apparatus comprises carrier means for holding the film in a flat state, first positioning means including a first positioning member for contacting and positioning the carrier means at a screen projecting position so as to project the image information on the film onto the observation screen during the functioning as the reader, second positioning means including a plurality of selectively operable second positioning members for selectively contacting and positioning the carrier means at a scanning starting position for scanning and projecting the image information on the film onto the the photosensitive member during the functioning as the printer, and scanning means for causing the carrier means to scan in one direction from the scanning starting position, with the carrier means being urged in the other direction for returning it to the starting position by return spring means. The first positioning member and plurality of selectively operable second positioning members are each provided with fine adjusting means for precisely adjusting the position thereof with respect to the carrier means so as to accurately position the carrier means in an efficient manner.

By the arrangement according to the present invention as described above, the functions as the reader and printer have been incorporated into the apparatus having a compact size, while wasted time or space in the scanning of the carrier is eliminated for improving the operating efficiency, with substantial elimination of disadvantages inherent in conventional reader-printers of this kind.

BRIEF DESCRIPTION OF THE DRAWINGS

These and other objects and features of the present invention will become apparent from the following description taken in conjunction with the preferred embodiment thereof with reference to the accompanying drawings, in which:

FIG. 1 is a perspective view of a reading and printing apparatus, i.e. a reader-printer according to one preferred embodiment of the present invention, FIG. 2 is a schematic side sectional view of the reader-printer of FIG. 1.

Before the description of the present invention proceeds, it is to be noted that like parts are designated by like reference numerals throughout views of the accompanying drawings.

DETAILED DESCRIPTION OF THE INVENTION

Figure 3:
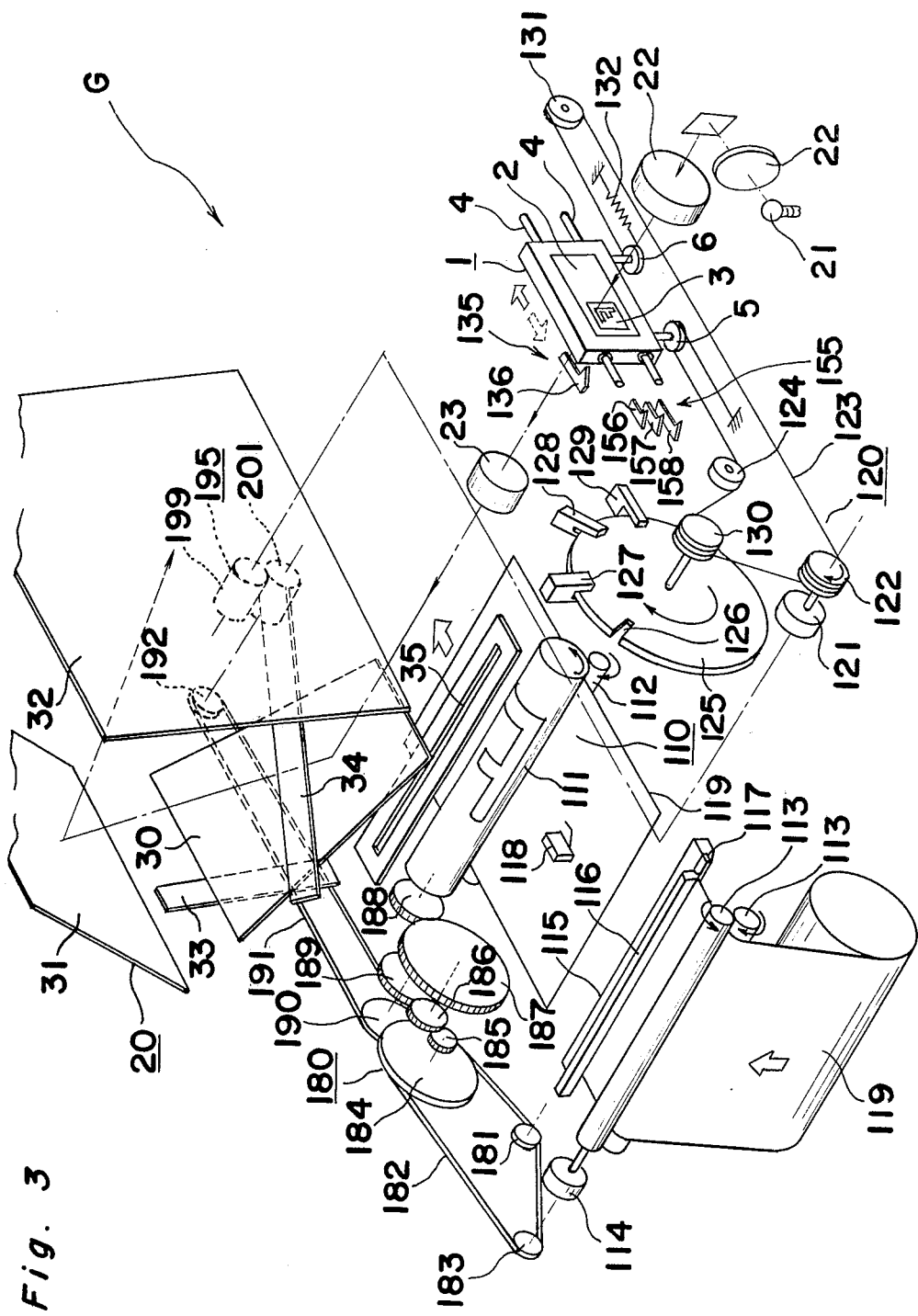
FIG. 3 is an exploded perspective view showing, on an enlarged scale, the internal arrangement of the reader-printer of FIG. 1.

Referring now to the drawings, there is shown in FIGS. 1 and 2 a reading and printing apparatus or reader-printer G according to the preferred embodiment of the present invention. The reader-printer Ggenerally comprises a base portion B of approximately rectangular box-like configuration, an upper portion U extending upwardly from the base portion B and having in its front wall an observation screen or display surface 32, and a control panel P extending laterally and forwardly from a lower edge of the observation screen 32 at a position between said base portion B and upper portion U and provided with an aperture card insertion opening C and various switches, knobs and the like for controlling the functions of the reader-printer G in a manner as described in detail hereinbelow.

The reader-printer G functions as a reader for projecting an image of a film onto the screen 32 and also functions as a printer for projecting the image onto a photosensitive drum or photoreceptor 111 (FIG. 3) by scanning for copying said image onto copy material, and as shown in FIG. 3, includes a carrier 1 holding an aperture card 2 containing therein a film having an image 3, thereon an optical system 20 for selectively projecting the image light of the image 3 onto the screen 32 for observation or onto the photoreceptor drum 111, a copying device 110 for copying an electrostatic latent image formed in a known manner on the photoreceptor drum 111 onto the copy material or copy paper 119, and a scanning device 120 for causing the carrier 1 to scan during the copying. The reader-printer G is further provided with a first positioning means 135 having an image central position stop 136 for positioning the carrier 1 so as to project the image light of the image 3 onto the screen 32, and a second positioning means 155 including scanning starting position stop 156, 157 and 158 for positioning the carrier 1 at the scanning starting position corresponding to the copying sizes so as to expose the photoreceptor drum 111 to the image light of the image 3 by scanning.

Figure 4:
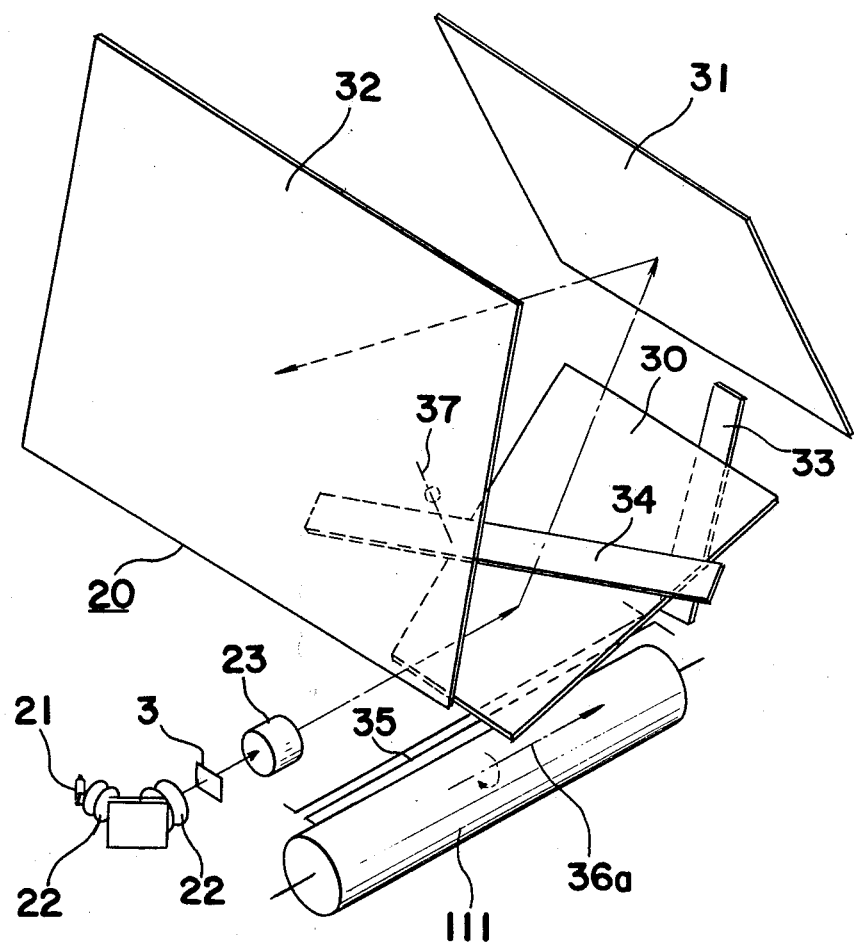
FIG. 4 is a perspective view showing the positions of the parts of an optical system during the reading function of the reader-printer of FIG. 1.

The optical system 20 as described above further includes a light source, for example, a projecting lamp 21, condense lenses 22 for collecting and directing light from the projection lamp 21 onto the image 3 on the film in the aperture card 2 held flat on the carrier 1 by any known means, a projecting lens 23, screen projection first and second reflecting mirrors 30 and 31 for projecting the image light of the image 3 onto the observation screen 32, and printing first and second reflecting mirrors 33 and 34 for exposing the photoreceptor drum 111 to the image light of the image 3 during scanning. The screen projection first reflecting mirror 30 and printing second reflecting mirror 34 are simultaneously movable from the positions shown in FIGS. 3 and 4 to the positions shown and when the mirrors 30 and 34 are in the positions shown in FIGS. 3 and 4, light from the projecting lens 23 reaches the reverse surface of the screen 32 via the screen projection first mirror 30 and second mirror 31 for enabling an enlarged image of the image 3 to be observed on the screen 32. In this mode the reader-printer G functions as a reader.

Figure 5:
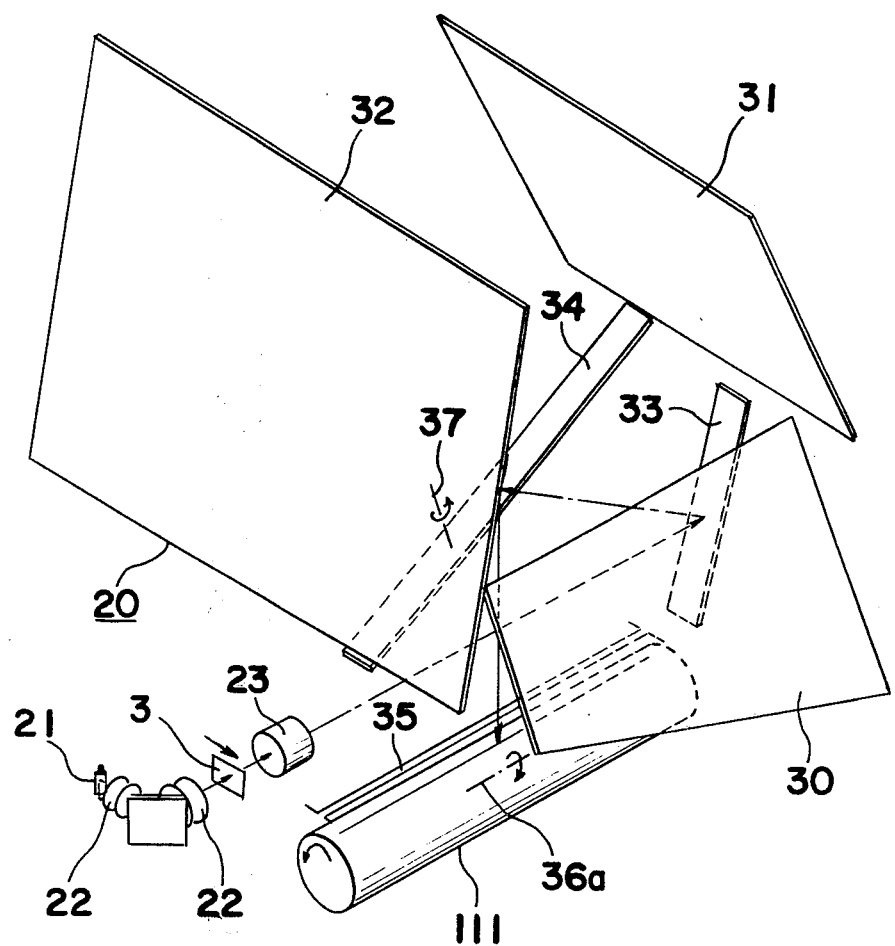
FIG. 5 is a view similar to FIG. 4, which particularly shows the positions of the parts of the optical system during the printing function of the reader-printer of FIG. 1.

However, then the two movable mirrors 30 and 34 are moved to the positions illustrated in FIG. 5 by rotation thereon about respective axes 36a and 37 (FIGS. 4 and 5). the image light from the projecting lens 23 is directed onto the surface of the photoreceptor drum 111 via the printing first and second mirrors 33 and 34 and via a slit 35 for exposing the photoreceptor drum 111 to the enlarged image of the image 3 during the scanning. In this mode, the reader-printer G functions as a printer.

During functioning as a reader as described earlier, the carrier 1 is positioned by the stop 136 so that the central portion of the image 3 is aligned with the optical axis of the optical system 20, while during the functioning as the printer, a carrier 1 is caused to scan toward the right in FIG. 3 by the scanning device 120 from the position whereat it is positioned by any one of the stoppers 156, 157 and 158, the arrangement of which will be described in more detail later.

A driving means 40 for shifting the screen projection first reflecting mirror 30 and printing second mirror 34 will be described hereinbelow along with the functioning thereof.

Figure 6:
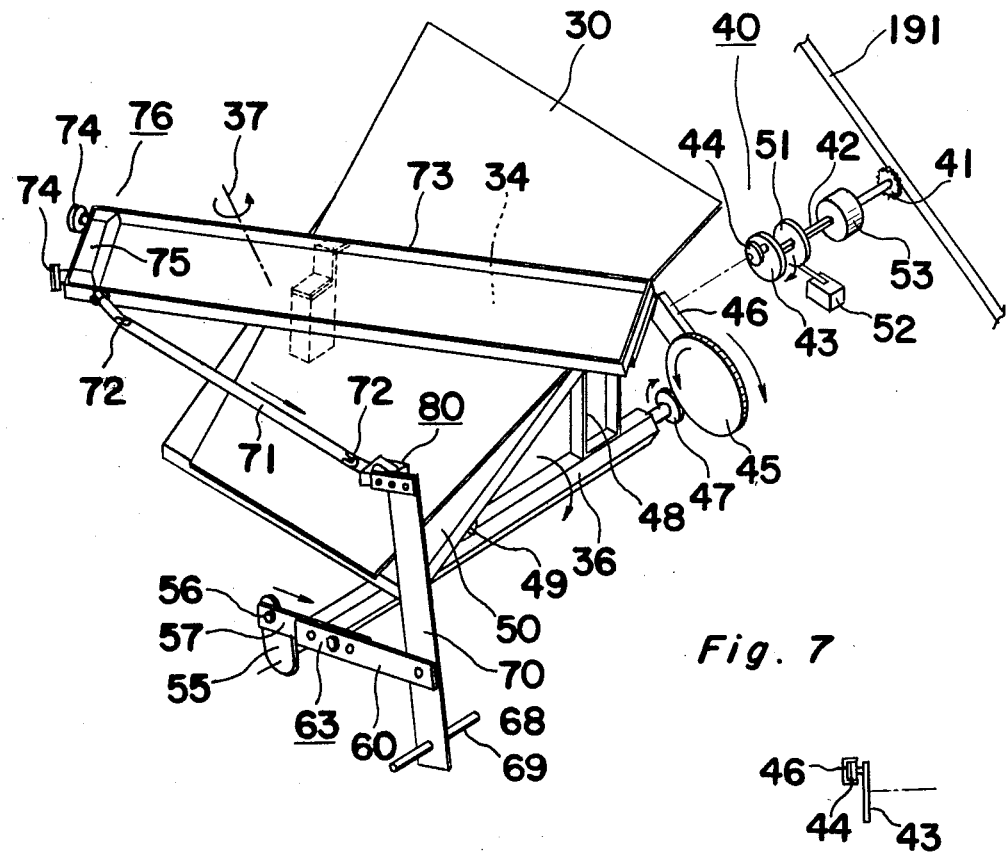
FIG. 6 is a perspective view showing driving means for the optical system employed in the reader-printer of FIG. 1.
Figure 7:
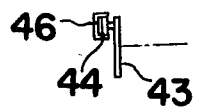
FIG. 7 is a fragmentary side elevational view of a cam arrangement employed in the driving means of FIG. 6.
Figure 23:
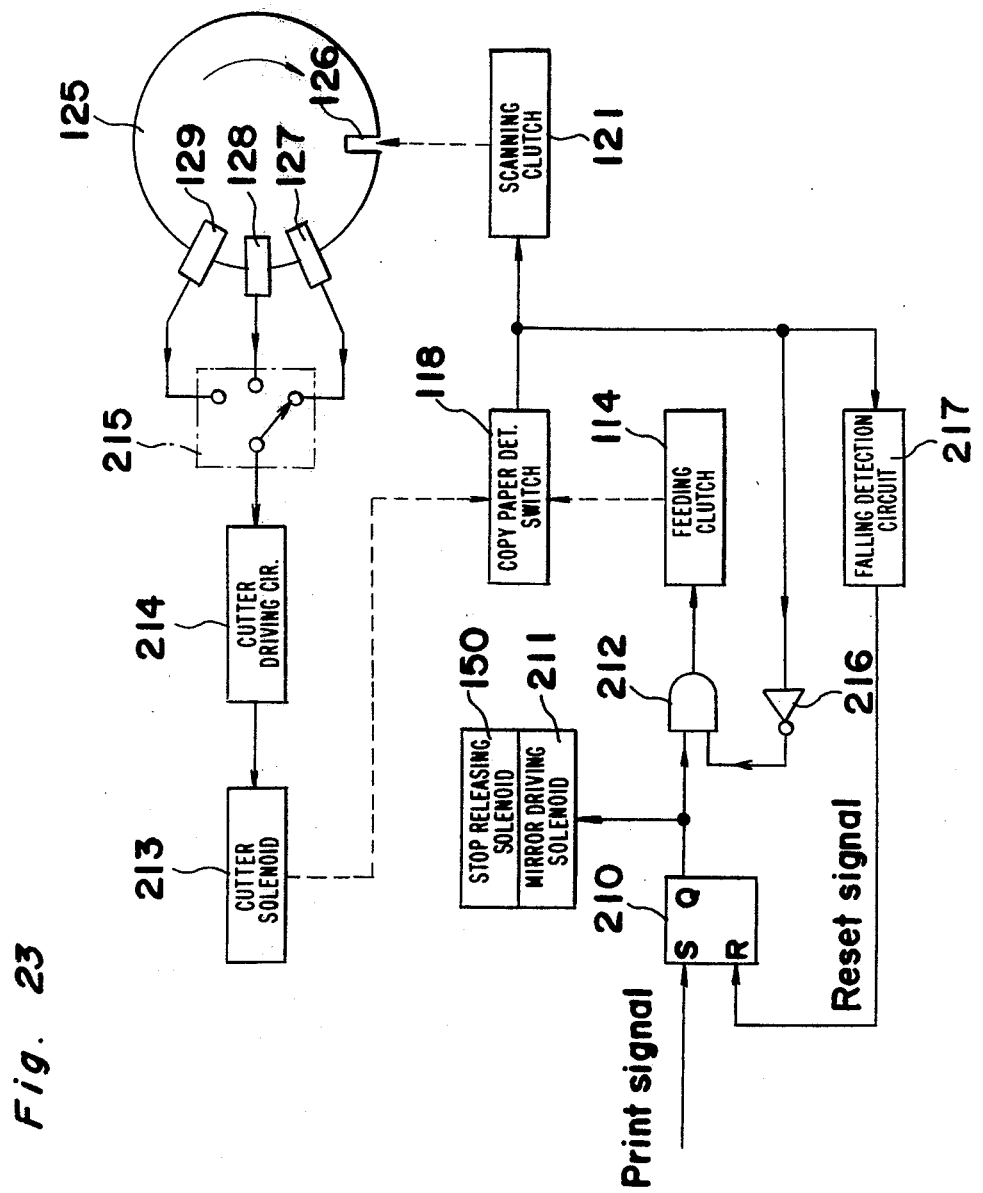
FIG. 23 is an electrical block diagram of a control circuit for controlling the operation of the scanning device.

Referring also to FIG. 6, at the forward end of a shaft 42 to which rotational force is transmitted from a belt 191 of a driving mechanism 180 (described later) of the reader-printer G through a gear 41 secured on the other end of the shaft 42, there is fixed a cam plate 43, and a roller 44 mounted on the cam plate 43 at a position offset from the rotational center of said cam plate 43 is engaged in a groove in a lever 46 having U-shaped cross section which is secured to one side face of a gear 45 as is most clearly seen in FIG. 7. The gear 45 is in mesh with a gear 47 secured to one end of the supporting shaft 36 for the screen projection first mirror 30, which is rigidly mounted on a mirror fixing plate 50 secured to the shaft 36 by fixing members 48 and 49. Therefore, upon rotation of the cam plate 43 due to the movement of the belt 191, the lever 46 engaging the roller 44 is subjected to reciprocating rotational movement, which is transmitted to the shaft 36 through the gear 47 for rotating the screen projection first mirror 30 around the axis 36a of the shaft 36. The rotational movement of the mirror 30 is controlled by turning a clutch 53 mounted on the shaft 42 ON or OFF through detection of rotation of another cam plate 51 fixed on the same shaft as the cam plate 43 by a microswitch 52, and thus, the gear 45 and lever 46 are subjected to reciprocating rotational movement through a predetermined angle. The clutch 53 is operated by the microswitch 52 and a mirror driving solenoid 211 (FIG. 23).

Meanwhile, to a lever 55 fixed to the other end of the support shaft 36 for the mirror 30, a lever 57 is connected by a pin 56, and the other end of the lever 57 is coupled to another lever 60 by adjusting means 63, with the other end of the lever 60 being connected by a pin 68 to a lever 70 pivotally mounted on a shaft 69. A lever 71 is connected to the upper end of the lever 70 by mirror depressing means 80, and the other end of the lever 71 is further coupled to a mirror fixing plate 73 having the printing second mirror 34 attached to its rear, as seen in the figure, surface, with the opposite ends of said lever 71 being constituted by universal joints 72.

The movement of the printing second mirror 34 will now be described.

The rotational movement of the support shaft 36 for the screen projection first reflecting mirror 30, the lever 55 is rotated clockwise, with consequent movements of the levers 57 and 60 toward the right in FIG. 6. Based on the above movements, the lever 70 is rotated clockwise above the shaft 69, with consequent movement of the lever 71 toward the right in FIG. 6, by which the mirror 34 is rotated counterclockwise together with the mirror fixing plate 73 about the axis 37. More specifically, the reflecting mirrors 30 and 34 are driven for ratation about the respective axes 36a and 37 by the driving means 40 from the same driving source, and by the clockwise rotation of the shaft 36, the mirror 30 is retracted from the light path through the projecting lens 23, i.e. from the position shown in FIGS. 4 and 6, to outside of the light path i.e. to the position illustrated in FIG. 5, while the mirror 34 is moved from outside of the light path i.e. the position shown in FIGS. 4 and 6 into said light path i.e. to the position as shown in FIG. 5, Moreover, by the counterclockwise rotation of the support shaft 36, the reflecting mirrors 30 and 34 are to the positions shown in FIGS. 4 and 6

Hereinbelow, adjusting means 63 provided on the mirror driving means 40, mirror depressing means 80 and depressing and fixing means 76 for the mirror 34 will be described.

Figure 8:
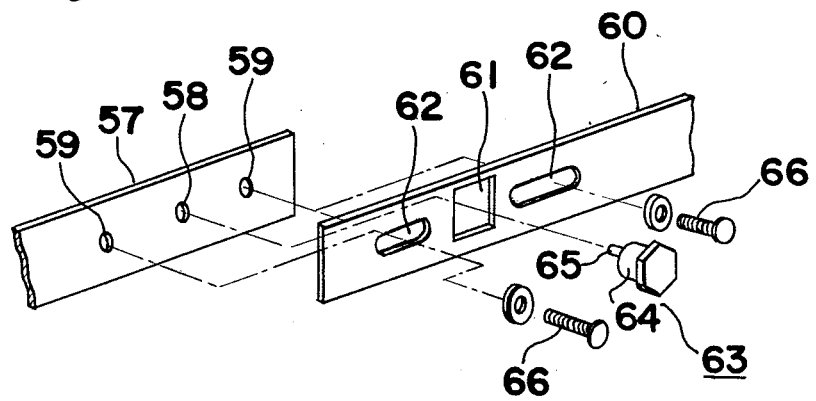
FIG. 8 is an exploded view of adjusting means employed in the driving means of FIG. 6.
Figure 9:
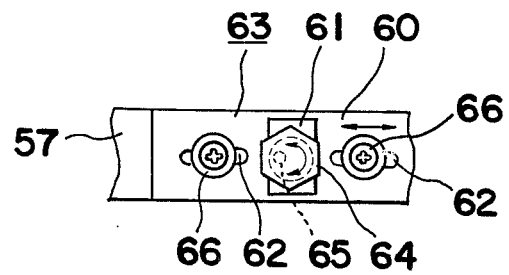
FIG. 9 is a fragmentary front view of the adjusting means of FIG. 8.

As shown in FIGS. 8 and 9, the adjusting means 63 includes the lever 60 having a square opening 61, and a pair of elongated openings 62 positioned on opposite sides of said square opening 61, the lever 57 having an opening 58 and threaded openings 59 corresponding to opening 6, located in positions corresponding to said openings 62 of the lever 60, and an eccentric cam 64 provided with an eccentric pin 65 extending outwardly from one end of the cam 64 and inserted into the square opening 61, with the eccentric pin 65 being rotatably engaged with to the lever 57 in the opening 58 of said lever 57, while screws 66 are threaded into the openings 59 through the elongated openings 62 of the lever 60.

In the adjusting means as described above, when the eccentric cam 64 is rotated about the pin 65 thereof while the screws are loosened, the contact between the peripheral surface of the eccentric cam 64 and the edge portion of the square opening 61 of the lever 60 is relatively varied, and the overall length of the combined levers 57 and 60 is subjected to fine adjustment. After completion of the fine adjustment, the screws 66 are tightened for fixing the length of the levers 57 and 60. During the fine adjustment, the screws 66 movably fitted into the elongated openings 62 also serve as guide members.

Figure 10:
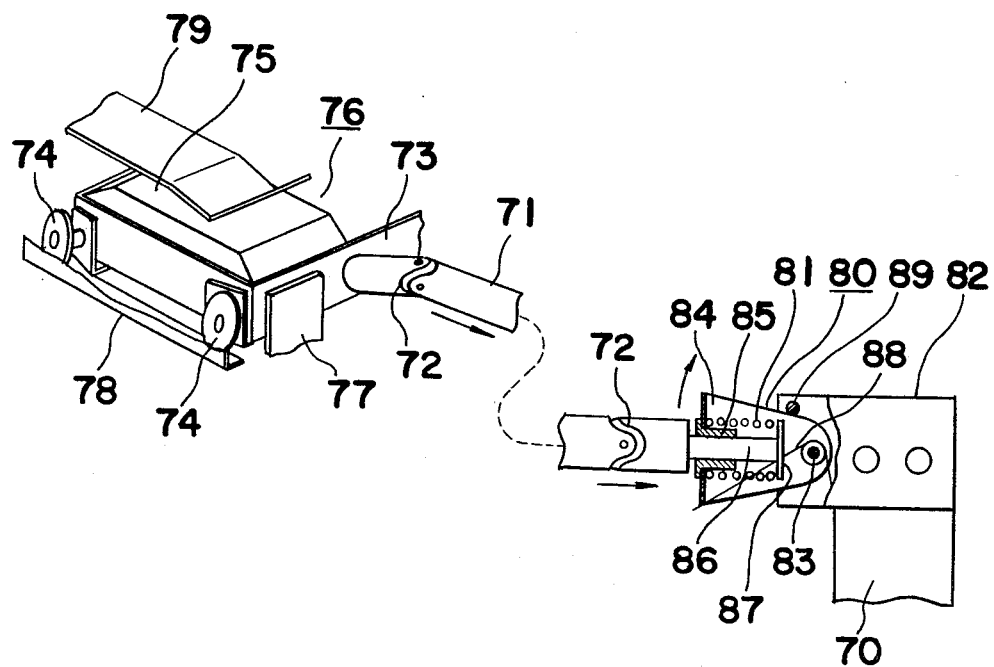
FIG. 10 is a fragmentary view, partly in perspective and partly in a sectional elevation, of mirror depressing and fixing means employed in the driving means of FIG. 6.

As shown in FIG. 10, the mirror depressing and fixing means 76 is intended to position and fix the mirror 34 for preventing side plays or looseness thereof when the mirror 34 is rotated into the light path, and has a side portion of the mirror fixing plate 73 and rollers 74 rotatably mounted on said mirror fixing plate 73 respectively contacting a mirror stop 77 and a positioning plate 78, while a plate spring 79 is in pressure contact with an engaging plate 75 provided on the upper surface of the mirror fixing plate 73. On the other hand, the mirror depressing means 80 specifically shown in FIG. 10 is intended to allow the lever 70 to continue rotate when the mirror 34 is turned against the urging force of a coil spring 81 and also to achieve positive positioning of the mirror 34 without any looseness or side play by resiliently urging the mirror fixing plate 73 toward the mirror stop 77, and is has a lever 84 rotatably mounted on a shaft 83 on a bracket 82 fixed to the upper end of the lever 70, and a shaft 86 provided at one end of the lever 71 is slidably inserted into a bearing 85 provided on the lever 81, the coil spring 81 being held under compression between the lever 84 and a flange portion 87 on the shaft 86. The lever 84 is urged clockwise in FIG. 10 by a torsion spring 88 wound around the shaft 83 the rotation thereof being restricted by a pin 89 fixed to the bracket 82.

The lever 70 is rotated clockwise as described above during rotation of the mirror 34, and is further turned to a certain extent even after the mirror fixing plate 73 rotated by the lever 71 is restricted in its rotation by the mirror stop 77. The further rotation is absorbed by the compression of the coil spring 81 and the mirror fixing plate 73 is resiliently pressed against the mirror stop 77 by the force of the spring 81, and thus, the positioning and prevention of side plays of the mirror 34 are achieved in cooperation with the mirror depressing and fixing means 76.

The operation of the copying device 110 will be explained hereinbelow with reference to FIG. 3.

The copying device 110 may be of a known type in which a visible image or an electrostatic latent image formed on the photoreceptor drum 111 by the optical system 20 mentioned earlier is transferred onto copy paper 119. In other words, if the copying process is an elctrostatic latent image trasfer type, the latent image formed on the surface of the photoreceptor drum 111 by charging and exposure is developed and fixed in a known manner after it has been transferred onto the copy paper 119 by a transfer roller 112, while on the other hand, if the copying process is a visible image transfer type, charging, exposure and development of the latent image is effected on the photoreceptor drum 111, and the thus developed image is transferred onto the copy paper 119 by a trasfer charger (not shown) for being subsequently fixed.

More specifically, the leading edge of the copy paper in roll form is held between a pair of copy paper feeding rollers 113, and is located immediately ahead of cutter means 115 including a stationary blade 116 and a rotary blade 117. Rotational force is transmitted to the rollers 113 from a driving mechanism 180 described more in detail later through a copy paper feeding clutch 114, and the copy paper 119 is fed between the stationary blade 116 and rotary blade 117 of the cutter means 115 as the feeding rollers 113 rotate. When a predetermined length of the copy paper 119 is fed the cutter means 115 is actuated by a preliminarily selected cutting signal to cut the copy paper 119 into a copy paper sheet of predetermined size. As the copy paper sheet 119 passes between the photoreceptor drum 111 and the transfer roller 112 and held in pressure contact therewith so as to follow the rotation of the drum 111, the electrostatic latent image or visible toner image of the original image 3 formed on the drum 111 is transferred onto the copy paper sheet 119. In transporting path of the copy paper sheet 119 at a position between the cutter means 115 and transfer section equipped with the transfer roller 112, ther is provided a microswitch 118 for detecting the passing of the copy paper sheet 119. The microswitch 118 is intended to determine the timing of starting of the scanning for the carrier 1 by detection of the leading edge of the copy paper sheet 119, and when the microswitch 118 detects the passage of the leading edge of the copy paper sheet 119, a scanning clutch 121 of the scanning device 120 described in detail later is energized or turned ON for causing the carrier 1 to scan. At the position whereat the copy paper sheet 119 is detected by the microswitch 118, the edge of the image formed on the photoreceptor drum 111 is arranged to be synchronized with the leading edge of the copy paper sheet 119 at the transfer section. It is to be noted here that instead of one microswitch 118 a plurality of microswitches can be provided, and that the microswitch 118 may be replaced by other copy paper detecting means such as a photo-coupler or the like.

The construction and function of the scanning device 120 will be described herinbelow.

Figure 11:
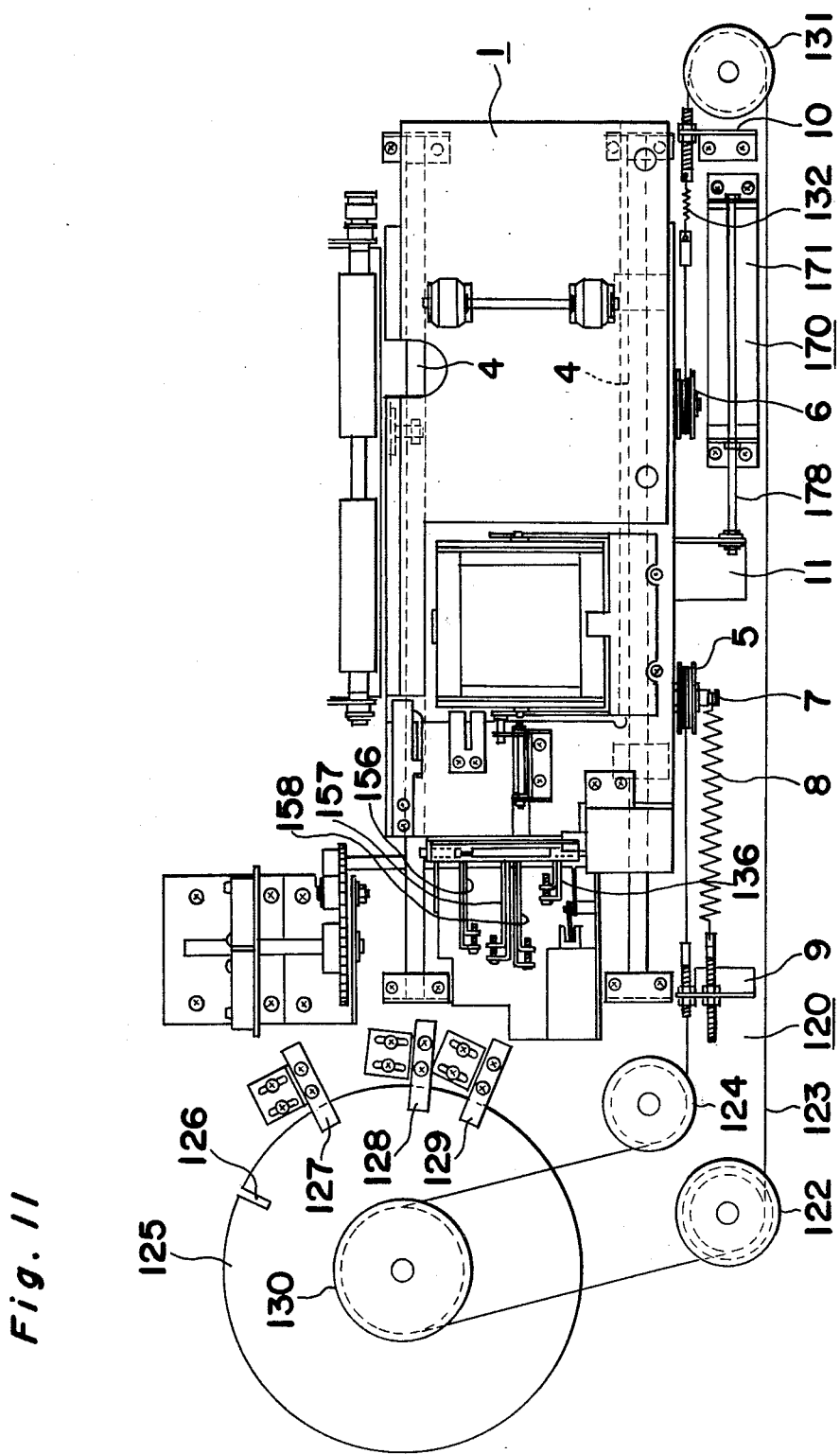
FIG. 11 is a front elevational view of the arrangement of FIG. 3.

Still referring to FIG. 3, the carrier 1 is slidably mounted on a guide shaft 4 and is arranged to be moved in a scanning motion by driving a wire 123 described below and to be returned by the tension of a return spring 8 as shown in FIG. 11.

More specifically, the wire 123 is secured at its one end to a bracket 9 as shown in FIG. 11 and is wound several times around a control disc driving pulley 130 fixed to the same shaft as a control disc 125 after being directed around a carrier pulley 5 on the carrier 1 and over an idle pulley 124, and is then wound several times around a driving pulley 122 coupled to the scan clutch 121 and subsequently is directed around an idle pulley 131 and another carrier pulley 6 and is fixed at its other end to a bracket 10 (FIG. 11) through a wire spring 132.

The scan clutch 121 mentioned above is coupled to the driving mechanism 180 through fine adjusting means 195, and only when the clutch 121 is turned ON by a detecting signal from the copy paper detection microswitch 118 is the rotational force transmitted to the driving pulley 122 for rotating said pulley 122 in the clockwise direction so as to cause the carrier 1 to scan rightward in FIG. 3.

Meanwhile, the control disc 125 rotates in synchronization with the pulley 130 following movement of the wire 123 and has a notch 126 in its peripheral edge, and detectors 127, 128 and 129 capable of photoelectrically detecting the presence of the notch 126 by passing of therethrough are fixedly disposed in spaced relation to each other along the path of the edge of the control disc 125 as shown. The detectors 127, 128 and 129 are provided for determining lengths of the copy paper sheets, for example, a longitudinal length corresponding to A4 size (210 mm), A3 size (420 mm) and A2 size (594 mm), etc., and are arranged to actuate the cutter means 115 by detection of passing of the notch 126 by a selected one of said detectors. When the copy paper detection microswitch 118 is turned OFF by the trailing edge of the cut copy paper sheet 119, a signal is applied to the scan clutch 121 to stop the movement of the wire 123, and consequently the scanning of the carrier 1.

It should be noted here that the combination of the notch 126 and photoelectric detecting elements described as employed in the foregoing embodiment may be replaced by a combination of a cam and microswitches or a magnetic means and reed switches or by detectors of the photoelectric reflection type, but non contact detecting means is preferable to provide good durability and reliability.

On the other hand, the return spring 8 for the carrier 1 has one end connected to the bracket 9 and the other end secured to the support shaft 7 of the carrier pulley 5 as shown in FIG. 11. The carrier 1 is returned toward the left by the spring force of the return spring 8, which is expanded during the scanning, after termination of the scanning upon turning OFF of the scan clutch 121 in the manner described earlier. It is to be noted here that, although spring force is also accumulated in the wire spring 132 connected to the other end of the wire 123 as it is expanded together with the return spring 8 during the scanning, since the spring force of the wire spring 132 is considerably smaller than that of the return spring 8, the wire 123 and control disc 125 are returned together with the carrier 1 upon turning OFF of the scan clutch 121. Furthermore, for adjusting or reducing the returning speed as well as for absorbing impacts, there is provided an air damper 170 (FIG. 11), the piston shaft 178 of which is coupled to the carrier 1 by a bracket 11, for reciprocation within a cylinder 171 following the scanning and returning movements of the carrier 1. The air damper 170 having a known structure effects braking action only when the carrier 1 returns toward the left in FIG. 11.

For causing the reader-printer G to function as the reader, it is necessary to position a carrier 1 so that the central portion of the image 3 of the aperture card 2 is located on the optical axis of the optical system 20, and such positioning is effected by causing the carrier 1 to be stopped upon contact thereof with the image central position stop 136 provided in the first positioning means 135. Meanwhile, for functioning of the reader-printer G as a printer, it is required to set the carrier 1 at the scanning starting position according to the copying size for starting the scanning from such position. For the positioning at the scanning starting position as described above, a corresponding one of the three scanning starting position stop 156, 157 and 158 provided for the second positioning means 155 is brought into the path of movement of the carrier 1 according to the copying size, for example, A4, A3 and A2 sizes, so as to contact and stop the carrier 1.

More specifically, the carrier 1 is positioned by the stop 136 for functioning of the apparatus as the reader, while in the copying mode, since the stop 136 is released, the carrier 1 is moved toward the left in FIG. 3 by the action of the return spring 8 and stopped by one of the stops 156, 157 and 158 preliminarily selected according to the copying size. Upon starting of the copying, the carrier 1 is moved toward the right for scanning by the scanning device 120 as described above, and is returned toward the left by the return spring 8 after termination of the scanning. When copying on only one copy paper sheet, the image central position stop 136 enters the path of movement of the carrier 1 during the start of the returning movement of the carrier 1, and thus, the carrier 1 is stopped by the stop 136 in the course of returning. On the other hand, for continuous copying, the carrier 1 is stopped for positioning by the selected scanning starting position stop 156, 157 or 158 during each returning returning movement, and is stopped at the position for the reading when the image central position stop 136 is actuated at the start of the return movement after the final copy is made.

As described in the foregoing, it is by the force of the return spring 8 that the carrier 1 is brought into contact with the one of the scan starting position stoppers 156, 157 and 158 selected according to the desired copying size during change-over from the reading function to the printer function during returning in the course of continuous copying, and the carrier is positioned by the contact thereof with the image cetral position stop 136 during returning at the termination of the copying. The constructions and functions of the first and second positioning means 135 and 155 will be described in greater detail later.

The driving mechanism 180 for the copying device 110 including the photoreceptor drum 111, etc. and the scanning device 120 will be described hereinbelow.

As shown in FIG. 3, the driving mechanism 180 has a driving pulley 181 connected to a main motor (not shown), and the driving force of said main motor is transmitted to pulleys 183 and 184 from the driving pulley 181 through a belt 182, and is further transmitted to the photoreceptor drum 111 through a gear 185 secured to the same shaft as the pulley 184 and gears 186, 187 and 188 in mesh with the gear 185. The rotational force is also transmitted from the pulley 183 to the copy paper feeding rollers 113 through the feeding clutch 114.

On the other hand, from the gear 186 the rotational force is transmitted to the pulley 192 through a gear 189 and a pulley 190 secured to the same shaft as the gear 189 and a belt 191, and is further transmitted from the pulley 192 to a scanning clutch 121 of the scanning device 120 through fine adjusting means 195 described hereinbelow.

The fine adjusting means 195 further includes a rigid roller 199, for example, of metallic material and an elastic roller 201 made, for example, of rubber, polyurethane and the like for making the distance between the shafts therof adjustable by suitable screw means (not shown here) through elastic deformation of the outer periphery of elastic roller 201 by pressure contact of the rigid roller 199 therewith. In the above arrangement, the rotational ratio of the rollers 199 and 201 is altered by the amount equivalent to the elastic deformation of the external diameter of the elastic roller 201 for correcting the errors in the rotational force transmitted from the driving mechanism 180 to the scanning device 120. It is to be noted that the errors mentioned above imply, for example, deviations in the focal distances of the projecting lens 23 and in the length of the light path during assembling, or errors in the revolutions resulting from insufficient accuracy in the manufacture of the scan driving pulley 122, etc.

Furthermore, for obtaining a copied image at a predetermined magnification with respect to the original image 3 of the aperture card 2 during copying, when the projecting magnification of the projecting lens 23 is M, the peripheral speed of the photoreceptor drum 111 is M times the scanning speed of the carrier 1 driven by the scanning device 120. Moreover, in an arrangement wherein a plurality of projecting lenses having different projecting magnifications are selectively brought into the projecting position, suitable speed changing means (not shown) such as gears and the like are provided between the pulley 192 and fine adjusting means 195 so that the peripheral speed of the photoreceptor drum 111 becomes equal to the speed obtained by multiplication of the projecting magnification of the selected projecting lens 23 by the scanning speed of the carrier 1.

As is seen from the foregoing description, according to the apparatus of the present invention which includes first reflecting means at least part of which is arranged to be movable for projecting the entire image of the film onto the observation screen, second reflecting means at least part of which is arranged to be movable for projecting part of the desired film image onto the photoreceptor, drive means for selectively bringing the movable parts of the first and second reflecting means into or out of the light path of the projecting lens during changeover of the projection of the film image onto the observation screen or onto the photoreceptor, and the scanning device for moving the film at a speed corresponding to the projection when the image of the film is being projcted onto the photoreceptor, the functions as a reader and printer can be accommodated in an apparatus of compact size, while turbulence or blur of the images due to positional deviations and vibrations arising from advancing and retracting of the movable portion of the reflecting mirrors can be eliminated, since such advancing and retracting are effected accurately and cmoothly.

Particularly, by driving the driving means 40 for the reflecting mirrors 30 and 34 through one driving source or by making it possible to accurately adjust the amount of rotation of the mirrors 30 and 34 by provision of the adjusting means 63 having the roller 44 eccentric cam 64, and pin 65 the positional regulation of the mirrors 30 and 34 can be effected more correctly. Moreover, if the mirror depressing and fixing means 76 and mirror depressing means 80 are provided, correct positioning of the mirror 34 and prevention of side play thereof can be positively achieved.

Figure 12:
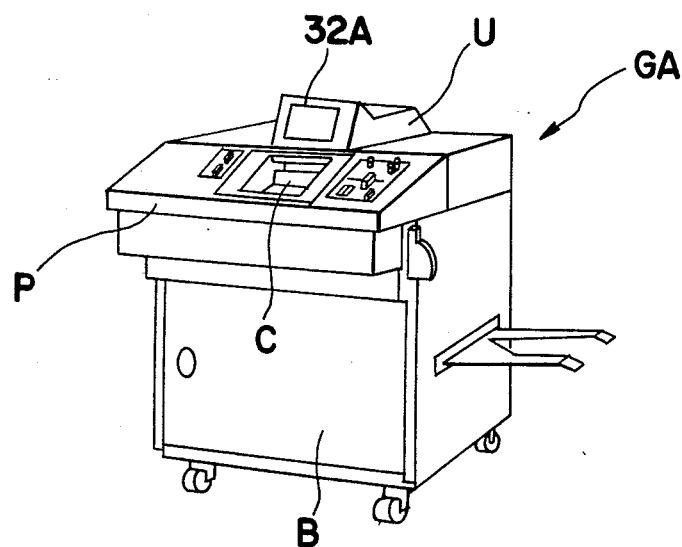
FIG. 12 is a perspective view of modified form of a reader-printer according to the present invention.
Figure 13:
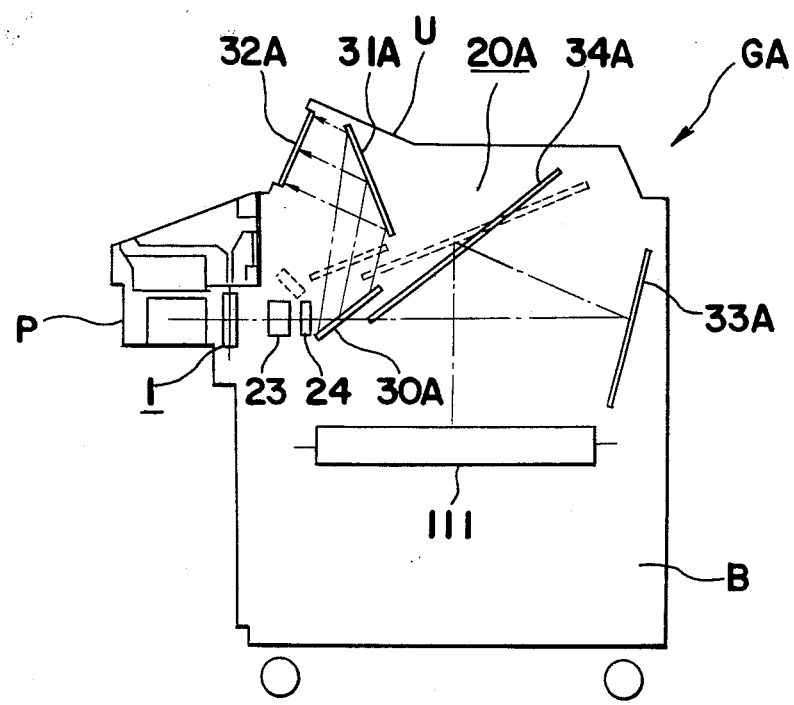
FIG. 13 is a schematic side sectional view of the reader-printer of FIG. 12.

Referring to FIGS. 12 to 17, there is shown in FIGS. 12 and 13 a modification of the reading and printing apparatus G of FIGS. 1 through 11. In the modified reading and printing apparatus GA of FIGS. 12 and 13, the observation screen 32 described as employed in the arrangement of FIGS. 1 and 2 is replaced by an observation screen 32A of considerably smaller size, while the modified projection optical system 20A further includes a converter 24 disposed adjacent to the projecting lens 23 for varying the focal length of the optical system, the configurations of the reflecting mirrors 30A and 31A and 33A and 34A being slightly different as compared with those in the apparatus G of FIGS. 1 and 2, although the rest of the construction and function of the modified apparatus GA of FIGS. 12 and 13 are generally similar to those of the apparatus G, and therefore, a detailed description thereof is omitted here for brevity.

Figure 14:
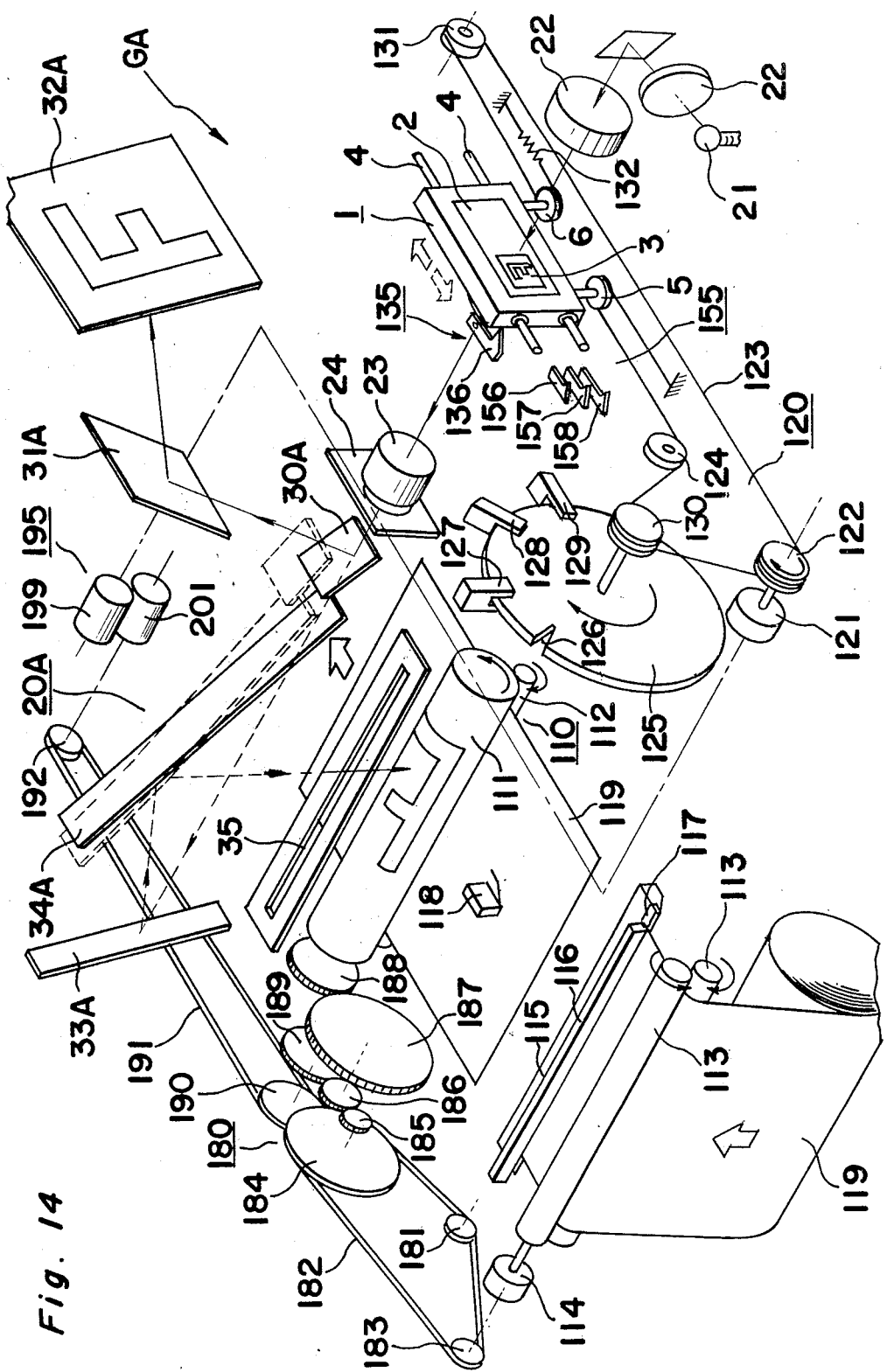
FIG. 14 is an exploded perspective view showing on an enlarged scale, the internal arrangement of the modified reader-printer of FIG. 12.
Figure 15:
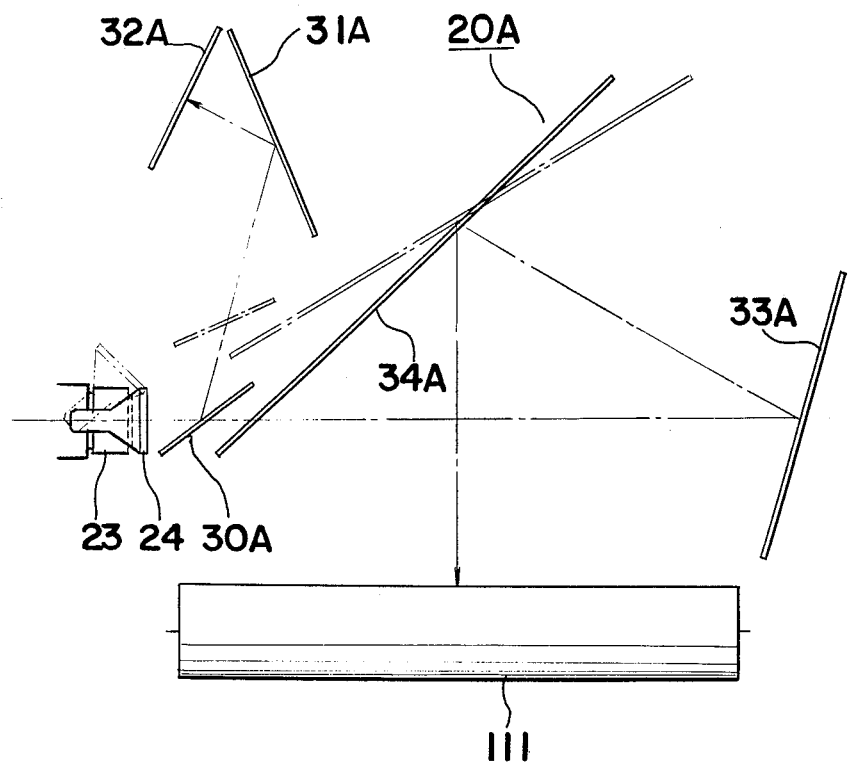
FIG. 15 is a schematic side elevational view of the optical system employed in the arrangement of FIG. 14.

As is seen from FIG. 14, the modified optical system 20A for the apparatus GA includes the projecting lamp 21, condenser lenses 22 for collecting and directing light from the projection lamp 21 onto the image 3 on the aperture card 2 held flat on the carrier 1, projecting lens 23, converter 24 for altering the focal length of the optical system 20A, screen projection first and second reflecting mirrors 30A and 31A for projecting the image light of the image 3 onto the observation screen 32A, and printing first and second mirrors 33A and 34A for exposing the photoreceptor drum 111 to the image light of the image 3 by the scanning. The screen projection first reflecting mirror 30A and printing second reflecting mirror 34A and the converter 24 are capable of simultaneously moving from the positions shown by full lines to the positions shown by chain lines in FIG. 15, and when the mirrors 30A and 34A and converter 24 are in the positions shown in full lines, light from the projecting lens 23 reaches the rear surface of the screen 32A through the converter 24 via the screen projection first mirror 30A and second mirror 31A for enabling an enlarged image of the image 3 to be obseved on the screen 32A. The function of the reader-printer MA as a reader is as described in the foregoing.

On the other hand when the two movable mirrors 30A and 34A and the converter 24 are moved to the position shown by the chain lines, the light from the projecting lens 23 is directed onto the surface of the photoreceptor drum 111 through the printing first and second mirrors 33A and 34A and via a slit 35 for exposing the photoreceptor drum 111 to the enlarged image of the image 3 during the scanning. In the above case, the reader-printer M functions as a printer.

It is to be noted here that in the functioning as a reader as described earlier, the focal length of the projecting lens 23 is shortened by the converter 24, and thus, the image is formed of the observation screen 32A at a small magnification as compared with that formed on the photoreceptor drum 111 in the absence of said converter 24.

Figure 16:
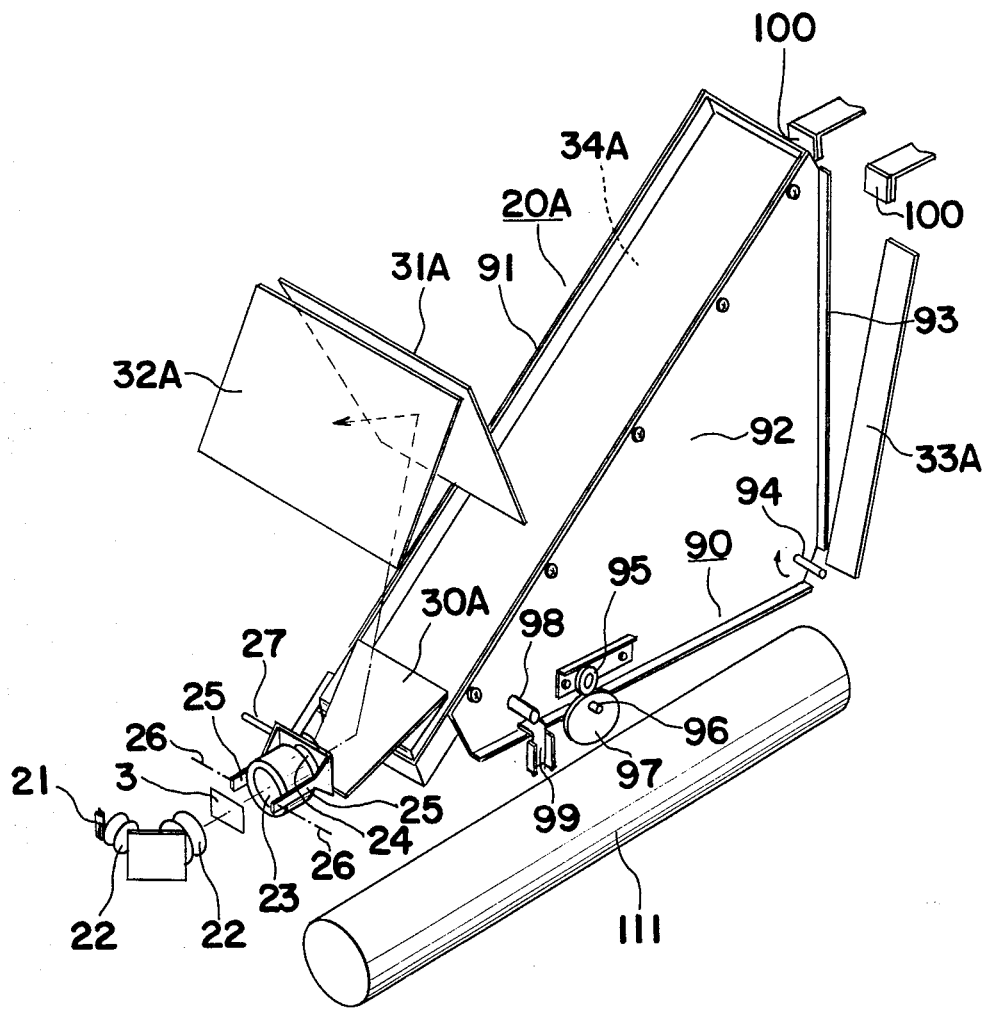
FIG. 16 is a perspective view showing the positions of the parts of the optical system and its driving means during the reading function employed in the arrangement of FIG. 14.
Figure 17:
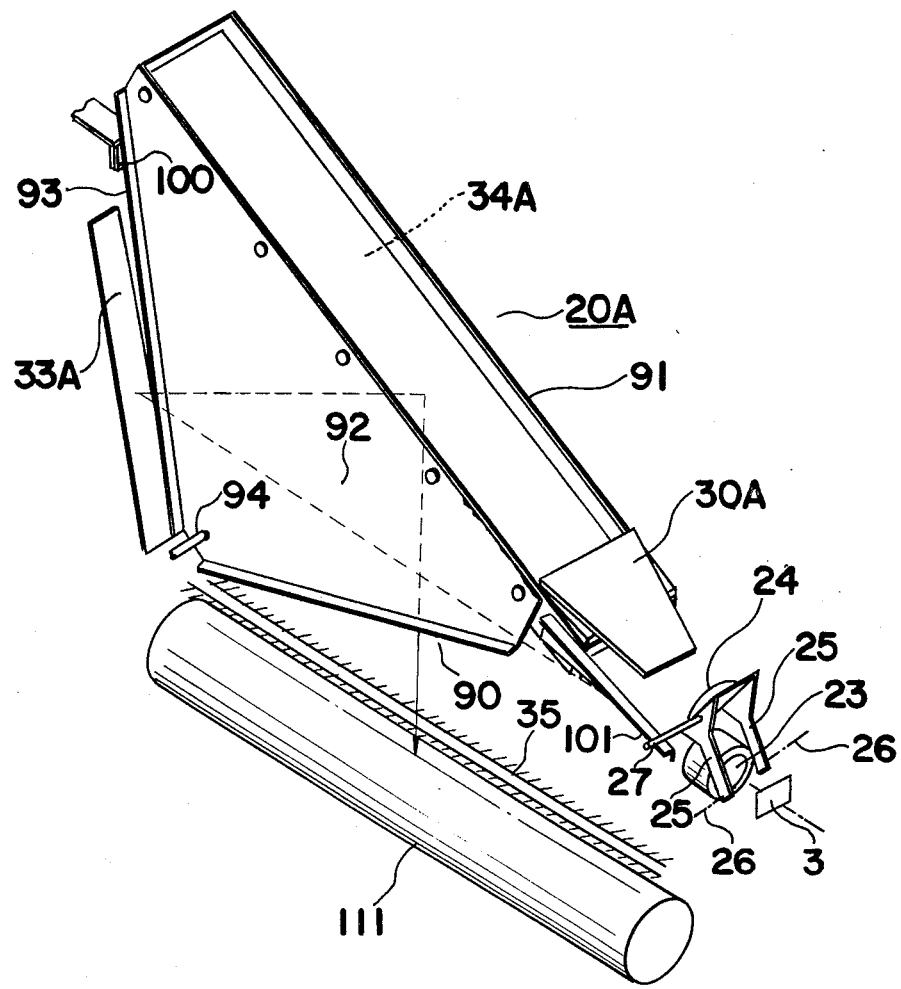
FIG. 17 is a view similar to FIG. 16, which particularly shows the positions of the parts of the optical system and its driving means during the printing function.

Referring particularly to FIGS. 16 and 17, driving means 90 for moving the screen first reflecting mirror 30A, print second reflecting mirror 34A and the converter 24 will be explained hereinbelow together with the functionings thereof.

In FIG. 16, the reflecting mirror 34A is secured to the rear surface of a mirror fixing plate 91 and the reflecting mirror 30A is fixed to the lower end of the upper surface of said fixing plate 91, and the fixing plate 91 has a side plate 92 of triangular shape which is pivotally supported on a shaft 94 for pivotal movement about the shaft 94. The rotational movements of the reflecting mirrors 30A and 34A are achieved by a cam follower 95 mounted adjacent to one side edge of the side plate 92 following the movement of a cam plate 97 rotatably driven by a shaft 96. The shaft 96 is connected to the driving mechanism 180 through a clutch (not shown) operated by a mirror driving solenoid 211 (FIG. 23).

More specifically, as shown in FIG. 16, when the cam follower 95 is at the small diameter portion of the cam plate 97, a pin 98 secured to the side plate 92 contacts a stop 99 fixed to a frame (not shown) of the apparatus GA from above, and thereby the mirror 30A is positioned in the light path of the projecting lens 23, with the image 3 being projected onto the observation screen 32A via the reflecting mirrors 30A and 31A. When the cam follower 95 is pushed up by the large diameter portion of the cam plate 97 as said cam plate 97 rotates, the reflecting mirrors 30A and 34A are rotated upwardly together with the mirror fixing plate 91 about the shaft 94, and the mirror 30A is spaced from the light path of the projecting lens 23, while the mirror 34A enters said light path and thus the image light of the image 3 is projected onto the photoreceptor drum 111 via the mirror 33A and the mirror 34A now present in the light path via the slit 35 as is seen from FIG. 17. When the apparatus is functioning as a printer as described above, a back plate 93 provided along a rear edge of the mirror fixing plate 91 is brought into pressure contact with stops 100 of resilient material such as rubber or the like which are secured to a frame (not shown) of the apparatus GA. These stops 100 are intended to absorb vibrations generated during the copying operation for preventing turbulence or blur of the copied image due to impacts to the mirrors resulting from such vibrations.

The converter 24 disposed adjacent to the projecting lens 23 and in front of the screen first reflecting mirror 30A is arranged to be pivotable upward and downward about an axis 26 through a support member 25, and a pin 27 extending laterally and outwardly from the support member 25 engages a release lever 101 secured to the lower end of the mirror fixing plate 91 from above. Therefore, during functioning as a reader, the converter 24 is located immediately before the projecting lens 23, i.e. in the light path thereof, with the pin 27 engaging the release lever 101 due to the weight of the converter 24 itself as shown in FIG. 16, while during the functioning as printer, a pin 27 is pushed up by the release lever 101 following the upward pivotal movement of the mirror fixing plate 91 to a certain extent, and thus, the converter 24 is rotated upwardly about the axis 26 to be spaced from said light path.

It is so be noted here that the converter 24 which is arranged to be moved in association with the driving means 90 for the reflecting mirrors 30A and 34A in the foregoing embodiment may be modified to be driven by independent means such as a solenoid and the like.

According to the modified arrangement of FIGS. 12 to 17, the reader-printer GA includes projecting optical means the focal length which is variable, first reflecting means at least part of which is arranged to be movable for projecting the entire image of the film onto the obsevation screen, second reflecting means a least part of which is arranged to be movable for projecting part of the desired film image onto the photoreceptor, drive means for selectively moving the movable parts of the first and second reflecting means into or out of the light path of the projecting lens during change-over of the projection of the film image onto the observation screen or onto the photoreceptor. Accordingly, not only are the functions as a reader and printer incorporated into the compact apparatus, but the focal length of the projecting optical system can be altered without any inconvenience for the reduction of the size of the apparatus, and the projected image can be monitored on the smallsized observation screen in addition to the advantages available in the arrangement of FIGS. 1 to 11. Particularly, if the converter 24 is associated with the driving means 90 for the reflecting mirrors 30A and 34A, the construction is made simpler, and furthermore, if the fixing plate 91 of the print second mirror 34A is arranged to contact stop 100 with resiliently positive positioning and prevention of side play of the reflecting mirror 34A can be achieved.

Figure 20:
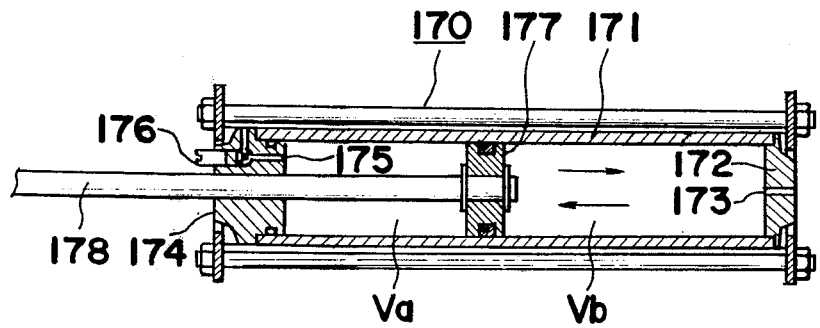
FIG. 20 is a side sectional view of an air damper employed in the arrangement of FIG. 14.

Referring particularly to FIG. 20, the construction and function of the air damper 170 mentioned earlier with reference to FIG. 11 for adjusting or reducing the returning speed of the carrier 1 will be described more in detail hereinbelow.

The forward end of the piston shaft 178 having at its other end a piston 177 slidably accommodated in the cylinder 171 is connected to the carrier 1 by the bracket 11 (FIG. 11), and a cylinder cap 172 provided at one end of the cylinder 171 has an air vent 173 at its central portion, while a piston bearing 174 fitted into the other end of the cylinder 171 has another air vent 175 into which an adjusting valve member 176 is threaded for making it possible to adjust the degree of opening of said air vent 175. During the scanning of the carrier 1, the piston 177 together with the piston shaft 178 moves toward the right at a steady speed so as to drive out air in the chamber Vb through the air vent 173 and also to draw in external air into the chamber Va of the cylinder 171. Upon termination of the scanning, when the carrier 1 starts returning due to the action of the return spring 8 as described earlier, the piston 177 and the shaft 178 move toward the left together with the carrier 1 to introduce external air into the chamber Vb of the cylinder 171 through the air vent 173, but in the above case, since the return speed is quite low as compared with the scanning speed, the air in the chamber Va is discharged through the air vent 175, but the rate of charge is reduced by the adjusting valve member 176, and the carrier 1 returns at a reduced speed corresponding to the amount of adjustment of the adjusting valve member 176, and thus, the impacts at the termination of returning of the carrier 1 are advantageously absorbed.

The construction and function of the first positioning means 135 including the image central position stop 136 and second positioning means 155 including the scan starting position stop 156, 157 and 158 will be described in detail hereinbelow with reference to FIG. 18(*a*) to 19.

Figure 18A:
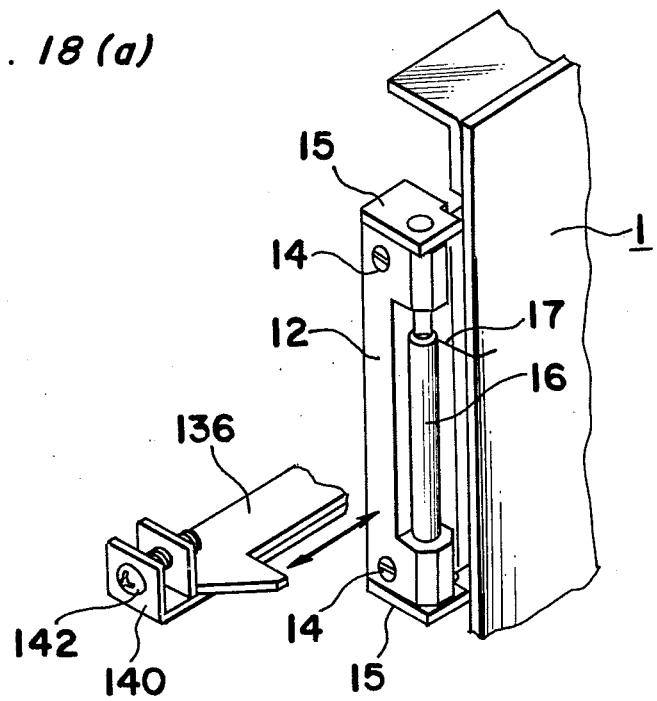
FIG. 18(a) is a fragmentary perspective view showing the relation between the carrier and its positioning means which may be employed in the arrangement of FIG. 14, FIGS. 18(b) and 18(c) are fragmentary front elevational views showing the relation between the carrier and a stop therefor.
Figure 18B:
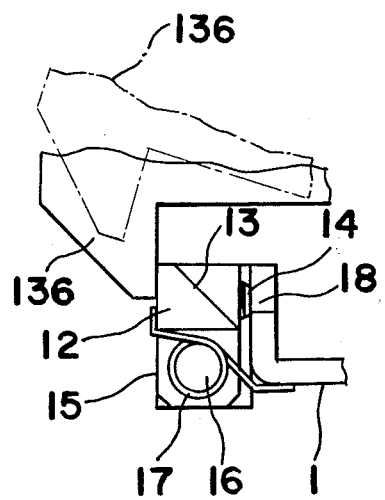

The first positioning means 135 (FIG. 14) intended for positioning the carrier 1 by the stop 136 thereof so that the central portion of the image 3 on the film of the aperture card 2 is brought onto the optical axis of the optical system 20A during the functioning of the reader-printer as a reader is arranged to effect the positioning by the contact of a contact member 12 mounted on the carrier 1 with the stop 136 from the right side in FIG. 18(*b*). As shown in FIG. 19, the image central position stop 136 is slidable on a stop adjusting plate 140 having a U-shaped cross section, and the forward end of an adjusting screw 142 provided on one bent end of the adjusting plate 140 is threaded into the corresponding bent end of the stop 136 for positional adjustment of stop 136 relative to plate 140. The stop 136 and adjusting plate 140 are held in position by slidably fitting a bearing portion 139 of a stop shaft 138 into elongated openings 137 and 141 respectively formed in the stop 136 and adjusting plate 140, while one end of a shock absorbing spring 145 connected at its other end to the forward end of a bolt 144 threaded into a fixing plate 143 is connected to the other bent end of the adjusting plate 140 for urging said adjusting plate 140 to a position such that the inner edge of the elongated opening 141 of the adjusting plate 140 contacts the bearing portion 139 of the stop shaft 138. Additionally, a shaft 146 having a roller 147 is secured to the botoom of adjusting plate 140, and the adjusting plate itself is urged clockwise about the stop shaft 138 by a stop spring 148 connected between a side edge of the plate 140 and a frame (not shown) of the apparatus, with the urging force of spring 148 being restricted by the contact of the roller 147 with a side edge of a release lever 151 connected at its one end to a plunger of a solenoid 150. When the solenoid 150 is turned OFF the release lever 151 is shifted toward the right in FIG. 19 by the tension of a return spring 153 connected between the other end of of the lever 151 and a frame (not shown) of the apparatus, with the roller 147 of the adjusting plate 140 contacting the side edge of the release lever 151, and the stop 136 is located at a position where it contacts the stop contact member 12 of the carrier 1 as shown by the solid lines in FIG. 18(*b*). Upon turning the solenoid 150 ON, the release lever 151 moves toward the left in FIG. 19, and the roller 147 of the adjusting plate 140 drops into a recess or notch 152 formed at one position of the corresponding side edge of the lever 151, and the stop 136 and stop adjusting plate 140 rotate clockwise to a certain extent by the action of the spring 148, and thus, the stop 136 is retracted to a position where it is spaced from the stop contact member 12 of the carrier 1 as shown by the chain lines in FIG. 18(*b*).

The second positioning means 155 intended to selectively determine the scanning starting position of the carrier 1 by the corresponding one of the three stops 156, 157 and 158 according to the copying sizes, for example, A4, A3 and A2 sizes, during functioning of the reader-printer as a printer as described earlier is arranged to effect the positioning by the contact of the stop contact member 12 of the carrier 1 with the selected one of the stops 156, 157 and 158 from the right side.

The scanning starting position stops 156, 157 and 158 of the second positioning means 155 are respectively slidable on corresponding stop adjusting plates 160, and each set of stops 156, 157 and 158, and corresponding adjusting plates 160 is coupled to each other by an adjusting screw 142, with bearing portions 139 of the stop shaft 138 being slidably fitted into elongated openings 159 and 161 formed in respective stops 156, 157 and 158 and stop adjusting plates 160, while each of the stop adjusting plates 160 is urged by the spring 145 connected between the bolt 144 threaded into the fixing plate 143 and the correspnding end of the adjusting plate 160 and also by the spring 148 connected between the plate 160 and the frame (not shown) of the apparatus in a manner similar to the stop 136 of the first positioning means 135. For selectively causing the stop 156, 157 and 158 to enter or retract from the plate of movement of the stop contact member 12 of the carrier 1, a stop cam 163 having a pin 164 fixed to a position on a peripheral portion thereof is secured on the rotatable stop shaft 162 at a position corresponding to each set of the stop adjusting plates 160 and stops 156, 157 and 158 as shown in FIG. 19. More specifically, three stop cams 163 are secured to the stop shaft 162 in positions corresponding to the three stops 156, 157 and 158, with stop pins 164 for the respective stop cams 163 being angularly offset from each other relative to the axis of shaft 162. The shaft 162 is rotated for positioning the stop pins 164 in engagement with the respective stops either manually or by suitable rotational driving means (not shown). When the stops 156, 157 and 158 are in contact with the peripheral faces of the stop cams 163 by the spring force of the springs 148, they are spaced from the stop contact member 12 of the carrier 1, and upon engagement of the side edge of the stops 156, 157 or 158 by the corresponding one of the stop pins 164 during rotation of the stop shaft 162, the stop thus engaged is rotated counterclockwise to a certain extent against the spring force of the spring 148 so as to enter the path of movement of the stop contact member 12 of the carrier 1 for stopping and positioning of the carrier 1.

Hereinbelow, the general operation of the carrier 1 relative to each of the positioning means 135 and 155 will be described.

During functioning as reader, since the roller 147 of the adjusting plate 140 for the stop 136 does not fall into the notch 152 of the release lever 151 because the solenoid 150 is turned OFF, the image central position stop 136 contacts the stop contact member 12 of the carrier 1, and thus, the carrier 1 is positioned so that the central portion of the image 3 in the film is located on the optical path of the optical system 20 or 20A as shown in FIG. 3 or 14.

For the copying, upon turning ON of the solenoid 150, since the release lever 151 is shifted toward the left in FIG. 19, the roller 147 of the adjusting plate 140 falls into the notch 152 of the lever 151, and engagement of the stop contact member 12 of the carrier 1 by the stop 136 is released. At this time, the carrier 1 is shifted toward the left in FIG. 3 or 14 by the action of the return spring 8, and the stop contact member 12 of the carrier 1 a corresponding one of the scanning starting position stops 156, 157 and 158 selected as desired by preliminarily rotating the stop shaft 162 to correspond to the copying size for positioning the carrier 1.

When the copying is started, the carrier 1 is scanned toward the right in FIG. 3 or 14 by the scanning device 120, and is returned toward the left by the spring force of the return spring 8 after termination of the scanning. For making one copy, the solenoid 150 is turned OFF during the starting of returning, and the stop 136 enters the path of movement of the stop contact member 12 so as to stop the carrier 1 by the stop 136 in the course of returning. On the other hand, for continuous copying, the carrier 1 is stopped for positioning by the selected one of the stops 156, 157 and 158 at each returning, and during the starting of returning after the final copy the solenoid 150 is turned OFF, and the stop 136 functions to stop the carrier 1 at the position for the functioning as a reader.

As described above, during the change-over from the reader function to the printer function or during returning in the course of the continuous copying, the carrier 1 contacts the corresponding one of the scanning starting position stops 156, 157 and 158 selected according to the copying size, by the spring force of the return spring 8, also contacts the image central position stop 136 during the returning upon termination of the copying. In the above case, since the returning speed is reduced and the shock of contact is absorbed by the air damper 170 described earlier, with further absorption thereof by the resiliency of the shock absorbing springs 145 provided on the adjusting plates 140 and 160 of the respective stops 136, 156, 157 and 158, impacts during the contact as described above are considerably reduced. In the above arrangement, since the spring force of the shock absorbing springs 145 is larger than that of the return spring 8, the spring 145 are slightly stretched during the contact of the carrier 1 as described in the foregoing, and consequently the respective stops 136, 156, 157 and 158 and adjusting plates 140 and 160 are shifted toward the left in FIG. 19, but are immediately brought back by the spring force of the shock absorbing springs 145 to the normal positions whereat the edge portions of the elongated openings 141 and 161 of the adjusting plates 140 and 160 contact the bearing portions 139 of the stop shaft 138. Moreover each of the stop 136, 156, 157 and 158 can be precisely adjusted individually for proper positioning by the adjusting screw 142 provided on each of the adjusting plates 140 and 160, and in addition the spring force of the shock absorbing springs 145 is adjustable by the bolts 144 provided on the fixing plate 143.

Figure 18C:
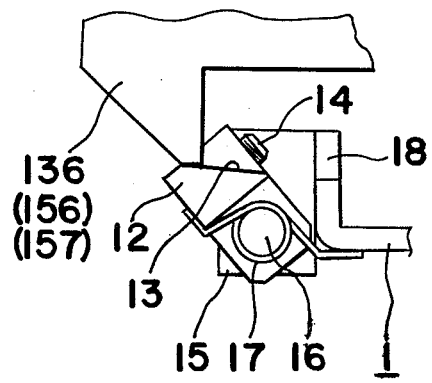
Figure 19:
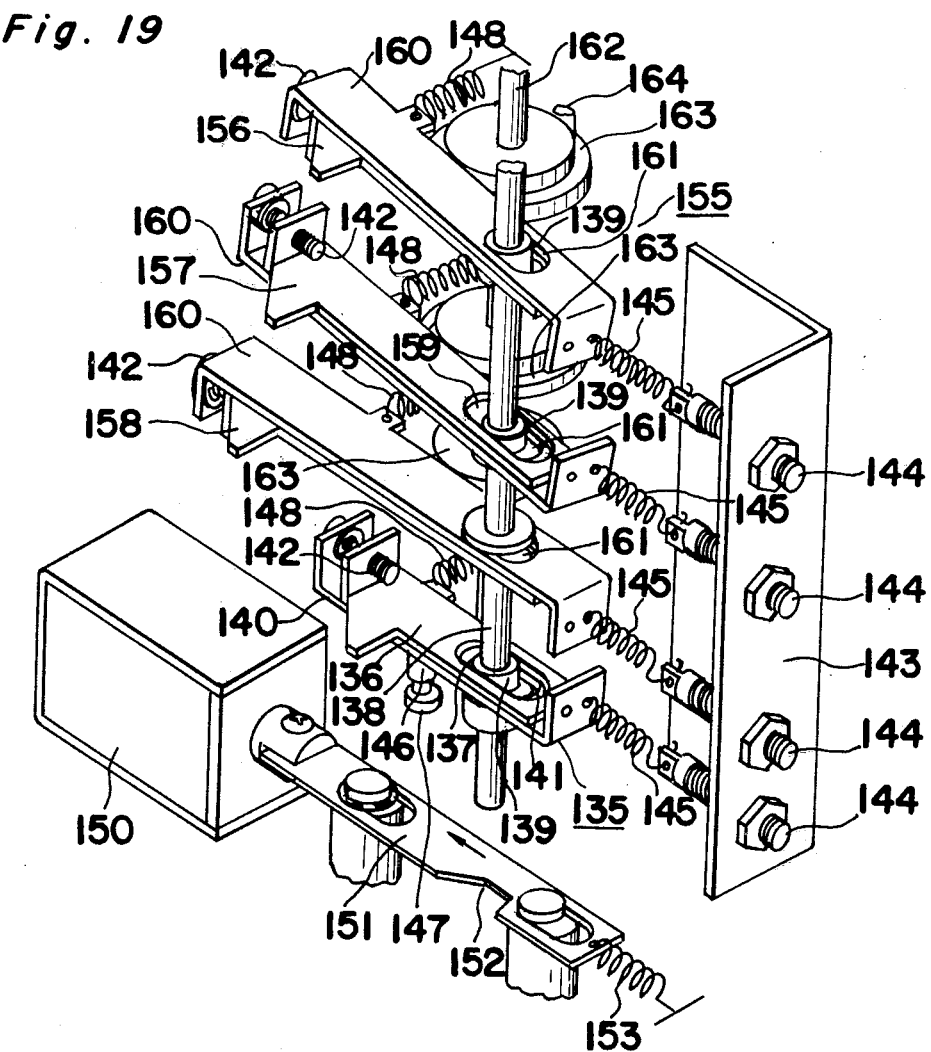
FIG. 19 is a perspective view of positioning means for the carrier which may be employed in the arrangement of FIG. 14.

On the other hand, as shown in FIG. 18(c), the stop contact member 12 of the carrier 1 is provided with escape means for cases where the stops 136, 156 and 157 enter the path of movement of the stop contact member 12 when the carrier 1 scans in the above described manner. More specifically, the stop contact member 12 having an inclined face 13 on its one side is rotatably mounted on a shaft 16 secured to the carrier 1 by brackets 15, and is urged clockwise in FIG. 18(c) by a torsion spring 17 disposed around the shaft 16, while the urging force thereof is restricted by the contact of the foward end of an adjusting screw 14 threaded into the contact member 12 with a bent portion 18 of the carrier 1.

Accordingly, even if the stop 136, 156 or 157 functions erroneously during the scanning of the carrier 1 and the inclined surface 13 of the stop contact member 12 contacts the stop 136, 156 or 157 from the right, the contact member 12 is rotated counterclockwise against the spring force of the torsion spring 17 and rides over the stop 136, 156 or 157. The position of the stop contact member 12 is adjusted by rotating the adjusting screw 14.

Figure 21:
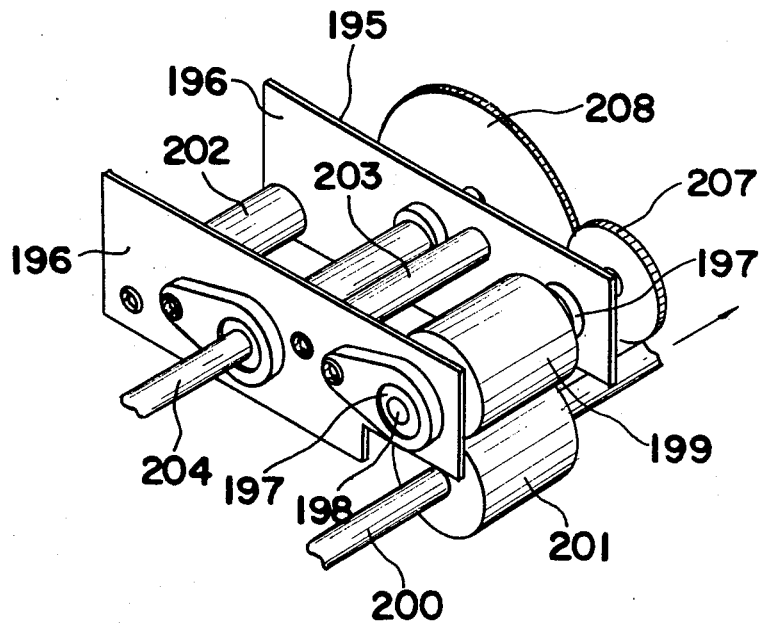
FIG. 21 is a perspective view showing the construction of fine adjusting means for adjusting the rotational force transmitted from the driving means to the scanning device.
Figure 22:
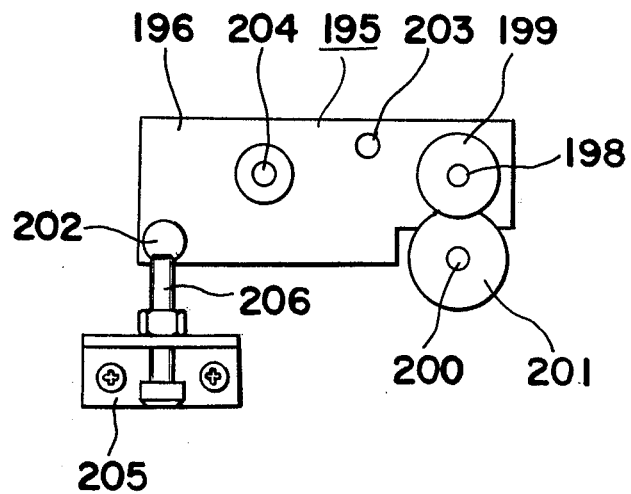
FIG. 22 is a front elevational view of the adjusting means of FIG. 21 on a reduced scale.

The fine adjusting means 195 mentioned earlier for adjusting the scanning speed related to the driving mechanism 180 (FIGS. 3 and 14) for the scanning device 120 will be described in detail hereinbelow with reference to FIGS. 21 and 22.

The fine turning means 195 intended to correct the deviations or errors in the revolutions to be transmitted from the driving mechanism 180 to the scanning device 120, for example, due to deviations in the focal length of the projecting lens 23 and the length of light path during assembling, or errors in the accuracy of manufacture of the scanning pulley 122, etc. includes the rigid roller 199 of metallic material and the like secured to a shaft 198 rotatably mounted between side plates 196 in bearings 197 and the elastic roller 201, for example, of rubber or polyurethane material fixed to a driving shaft 200 which is rotatable together with the pulley 192 (FIGS. 3 and 14) for the driving mechanism 180 described earlier. The side plates 196 are spaced from each other a predetermined distance by shafts 202 and 203 and are rotatable around an output shaft 204 connected to the copy paper feeding clutch 121 of the scanning device 120 (FIGS. 3 and 14), and are urged clockwise about the output shaft 204 when the shaft 202 is pushed upward by the forward end of the adjusting bolt 206 threaded into the bracket 205 fixed to the apparatus below the shaft 202, and the rigid roller 199 is brought into pressure contact with the peripheral surface of the elastic roller 201 so as to cause elastic deformation thereof. As mentioned earlier, the rotational ratio of the elastic roller 201 and rigid roller 199 is altered by the amount of the displacement if the external diameter of the elastic roller 201 due to the elastic deformation so as vary the revolutions to transmitted to the rigid roller 199. Additionally, a gear 207 secured to one end of the shaft 198 of the rigid roller 199 and a gear 208 fixed to one of the output shaft 204 are in mesh with each other, and the rotation of the rigid roller 199 is transmitted to the output shaft 204 through the gears 207 and 208 at a reduced speed.

Referreing to FIG. 23, control circuit for controlling the function of the scanning device 120 will be described hereinbelow.

During the functioning as a reader, a set-reset flip-flop 210 is in the reset state and the output thereof is "low". Therefore, the stop releasing solenoid 150 and mirror driving solenoid 211 are in the OFF state. In other words, the carrier 1 is blocked by the image central position stopper 136 at the screen projecting position, and since the screen first reflecting mirror 30 and print second reflecting mirror 34 are in the positions shown by the solid lines in FIG. 3, the image 3 on the film of the aperture card 2 is being projected onto the observation screen 32 at an enlarged scale.

Furthermore, since the output Q of the above flip-flop 210 is "low", output of an AND gate 212 is also "low", the copy paper feeding clutch 114 is turned OFF. Due to the fact that the copy paper detecting microswitch 118 is not detecting copy paper 119, the output is "low" and consequently, the scanning clutch 121 is also turned OFF. Meanwhile, the output of the microswitch 118 imparts a "high" level signal to the input of the AND gate 212 through an inverter 216. A copy paper length change-over switch 215 to be changed over simultaneously with the scanning starting position stops 156, 157 and 158 selected either manually or automatically according to the size of the image 3 in the aperture card 2 does not actuate the cutter driving circuit 214 and cutter solenoid 213, since in FIG. 3, the detector 127 is selected but the notch 126 of the control disc 125 rotating in synchronization with the movement of the carrier 1 is not detected.

On the other hand, when a print signal is applied to the S input of the set-reset flip-flop 210 upon depression of a print push button (not shown) or the like, the flip-flop 210 is brought into set state to make the output Q "high", by which the stop release solenoid 150 is turned ON to release the carrier 1 from the stop. The carrier 1 thus released is retutned toward the left in FIG. 3 or 14 by the tension of the return spring 8 so as to be again blocked by one of the scanning starting position stops 156, 157 and 58 preliminarily selected. Simultaneously, the mirror driving solenoid 211 is turned ON so as to move the converter 24, screen first mirror 30, and print second mirror 34 to the positions to the positions shown by the dotted lines in FIG. 14 and also the change over the optical system 20 from the reading function to the printing function.

Meanwhile, when the output Q of the above flip-flop 210 becomes "high", the output of the AND gate 212 is made "high" by the high level of the other input of said AND gate 212 connected to the flip-flop 210 for turning ON the copy paper feeding clutch 114. Upon turning ON of the clutch 114, the copy paper feeding rollers 113 start rotating to feed the copy paper 119. When the microswitch 118 is actuated by the copy paper 119 thus fed, the output of said microswitch 118 is made "high" to turn ON the screen clutch 121, and the carrier 1 starts the scanning. Simultaneously, since the input of the inverter 216 is changed to "high", the output of said inverter 216 becomes "low", and consequently, the output of the AND gate 212 is made "low" to turn OFF the clutch 114 for transporting the copy paper 119 by the plurality of transporatation rollers (not shown). In synchronization with the scanning of the carrier 1, the control disc 125 rotates clockwise, and when the notch 126 of the control disc 125 passes the detector 127, the cutter driving circuit 214 functions by the detection signal of the detector 127 to turn ON the cutter solenoid 213 for actuating the cutter means 115 to cut the copy paper 119 from the roll. When the trailing edge of the cut copy paper sheet 119 passes the microswitch 118, the output of said microswitch 118 becomes "low" to turn OFF the scan clutch 121, and the carrier 1 is returned by the tension of the return spring 8. Simultaneously, when the output of the microswitch 118 becomes "low", a falling detection circuit 217 produces a reset signal to be fed to the R input of the set-reset flip-flop 210, and this sets the flip-flop 210 back to the reset state, with the output Q thus made "low". Accordingly, the stop release solenoid 150 is turned OFF so as to block the carrier 1 is the course of returning by the image central position stopper 136. Meanwhile, the mirror driving solenoid 211 is also turned OFF, and the screen first mirror 30 and print second mirror 34 are returned to the state shown by the solid lines for changing the optical system 20 from the printing function back to the reading function.

Moreover, when the output of the above microswitch 118 becomes "low", the inverter 216 is inverted to make the input of the AND gate 212 "high", but since the set-reset 210 is simultaneously in the reset state, with the output Q being in the "low" state, the output of the AND gate 212 continues to be in the "low" state.

Although the functioning in the case of making one copy paper sheet is terminated as described above, for making a plurality of copies, the arrangement is such that when the microswitch 118 makes the output "low" by detection of the trailing edge of the copy paper sheet 119, the reset signal generated by the falling detecting circuit 217 does not reach the input of the set reset flip-flop 210 so that the output of the AND gate 212 again becomes "high" to effect the feed of copy paper for subsequent repetition of the same function. Therefore, in the above case, an additional circuit is provided which detects the number of copies and applies the reset signal of the falling detecting circuit 217 to the input R of the set-reset flip-flop 210 when the desired number of copies has been made.

As is clear from the foregoing description, in the arrangement of the present invention which includes the carrier for holding the film in a flat state, the first positioning means for positioning the carrier at the screen projecting position for projecting the image of the film onto the observation screen, the second positioning means for positioning said carrier at the scanning starting position for scanning and exposing the image of the film, and the scanning device for scanning the carrier from the scanning starting position, not only can the means for carrying out the reading and printing functions be incorporated in an apparatus of compact size, but wasted space and time involved in the scanning of the carrier are advantageously eliminated to provided an efficient reader-printer.

Particularly, if the second positioning means 155 is constituted by the scanning starting position stops 156, 157 and 158 which can be selectively actuated, the carrier 1 may be selectively positioned at the proper scanning starting position according to the sizes of the images to be copied which eliminates wasted space and time required for the scanning. Furthermore, by disposing the fine adjusting means 195 between the driving mechanism 180 and the scanning device 120, the deviation in the revolutions due to insufficient accuracy of the parts and errors in assembly, etc., i.e. deviations in the scanning speed of the carrier 1 can be accurately corrected. Moreover, the fine adjusting means 195 which has a simple construction constituted by the rigid roller 199 and the elastic roller 201 pressed against said rigid roller 199, is capable of readily and accurately adjusting the revolutions to be transmitted by altering the distance between the shafts thereof by simple manipulation of the adjusting bolt 206.

Meanwhile, since it is so arranged that the notch 126 formed in the peripheral edge of the control disc 125 of large diameter which rotates in synchronization with the scanning of the carrier 1 is detected by the detectors 127, 128 and 129, the scanning positions of the carrier 1 are thus detected, as it were, on an enlarged scale with high accuracy and thus, fine adjustments and the like of the detected positions are facilitated. In addition, by the provisions of the air damper 170 for reducing the returning speed of the carrier 1 and the shock absorbing spring 145 for the first and second positioning means 135 and 155, the impacts at the termination of returning of the carrier 1 are absorbed so that noises and vibrations are prevented with consequent improvement in durability and accuracy of the reader-printer.

Figure 24:
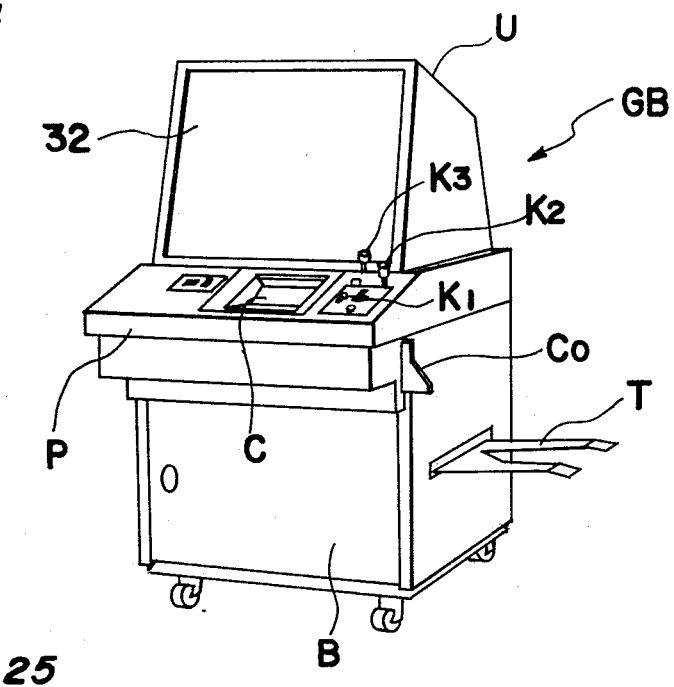
FIG. 24 is a view similar to FIG. 1, which particularly shows another modification thereof.
Figure 25:
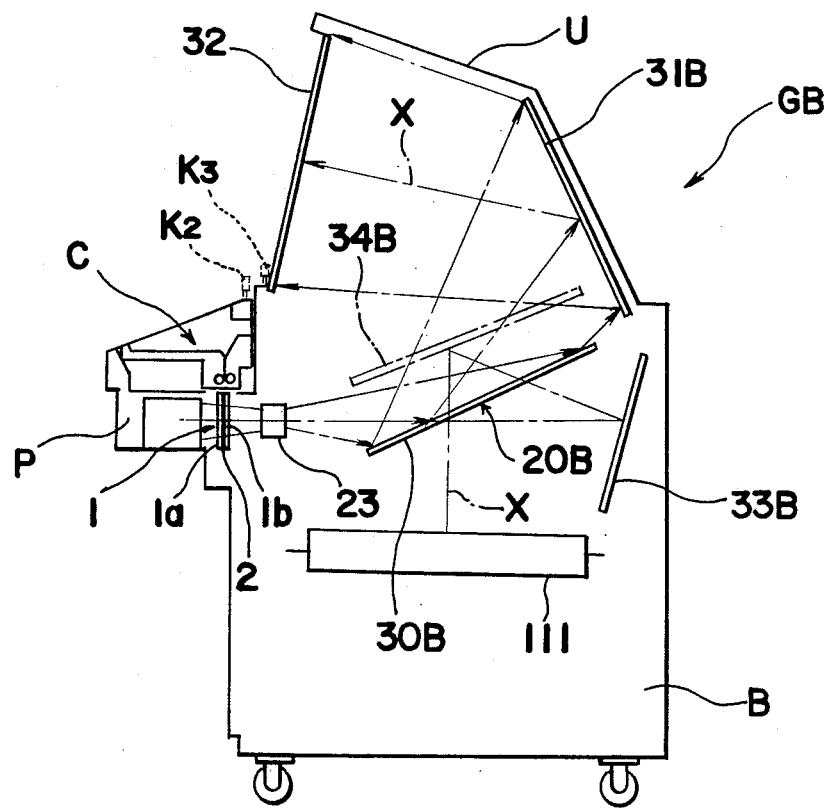
FIG. 25 is a schematic cross sectional view of the modified reader-printer of FIG. 24.

Referring to FIGS. 24 and 25, there is shown a further modification of the reader-printer G of FIGS. 1 and 2. In the modified reader-printer GB of FIGS. 24 and 25, there are further incorporated means for selective changeover of a plurality of projection lenses and means for adjusting the positions of the projected images in a manner as described hereinbelow.

Apart from the inclusion of the means mentioned above, the reader-printer GB of FIGS. 24 and 25 has a construction generally similar to that of the reader-printer G of FIGS. 1 and 2, with like parts being designated by like reference numerals or symbols, and for functioning as a reader, the aperture card 2 held flat between a pair of glass plates 1a and 1b of the carrier 1 is illuminated by a light source (not shown here) and the image on the film in the aperture card 2 is projected onto the screen 32 through the projecting lens 23 via the reflecting mirrors 30B and 31B of the optical system 20B. Meanwhile, for functioning as a printer, the mirror 30B is withddraw from the light path and the mirrors 33B and 34B constitute the optical system for directing the image toward the photoreceptor drum 111 to project the image onto the photoreceptor drum 111 for copying onto copy paper by scanning. On the control panel P, the aperture card inserting opening C, an exposure adjusting knob K1 and other adjusting knobs K2 and K3, etc. described in detail later are provided, while at one side of the readerprinter GB, an aperture card discharge opening Co is provided as well as a discharge tray T for the copy or copies.

Figure 26:
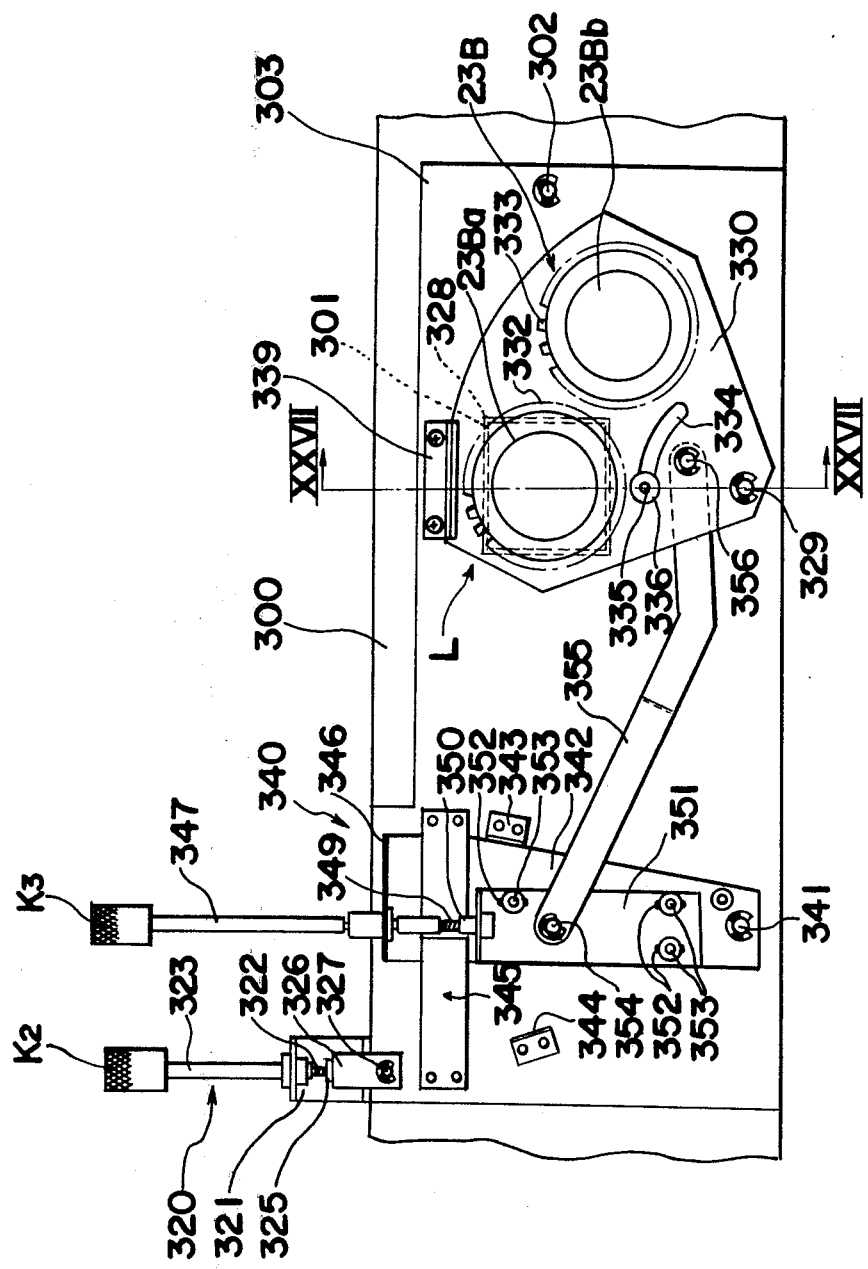
FIG. 26 is a schematic top plan view of projecting lens adjusting means employed in the arrangement of FIG. 24.
Figure 27:
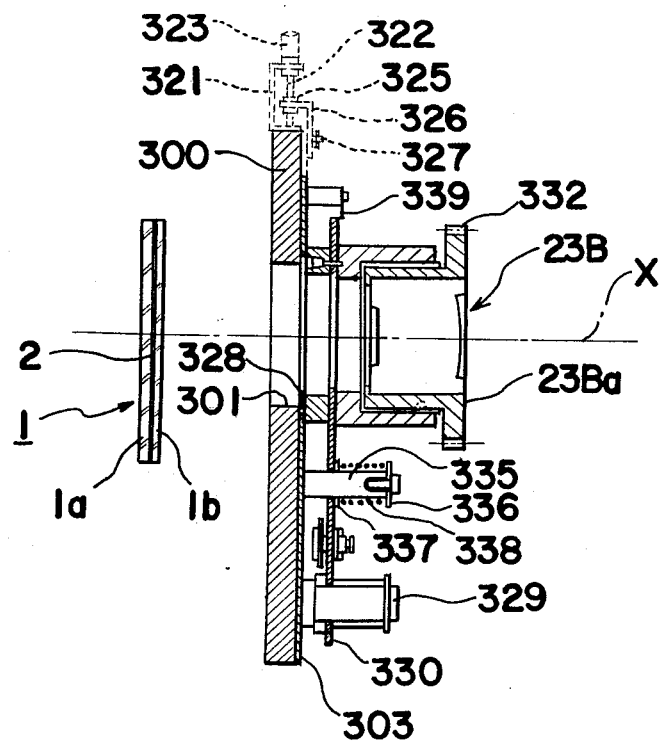
FIG. 27 is a cross section taken along the line XXVII—XXVII in FIG. 26.
Figure 28:
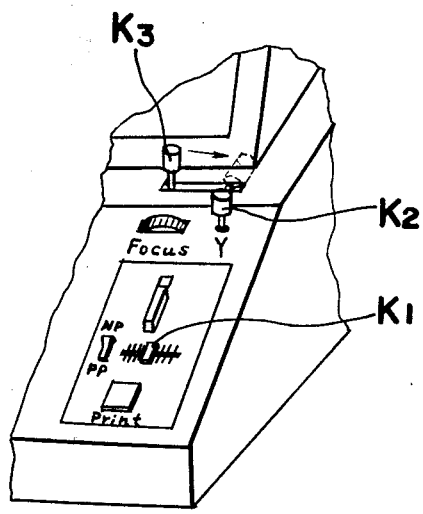
FIG. 28 is a fragmentary perspective view showing, on an enlarged scale, the positions of various adjusting knobs on a control panel of the reader-printer of FIG. 24.

Referring particularly to FIGS. 26 and 27, there is shown an arrangement for adjusting the projecting lens 23 which is incorporated in the reader-printer GB of FIGS. 24 and 25. In this arrangement, in a frame 300 of the reader-printer GB, there is formed an opening 301 at a position confronting the image on the film in the aperture card 2 held by the carrier 1. Adjacent to the opening 301, there is disposed the projection lens 23Ba of the projection lens assembly 23B for projecting the image of the film onto the observation screen 32 along an optical axis X. On the frame 300, a base plate 303 is pivotally supported by a shaft 302 secured to the frame and extending in a direction parallel to the optical axis X, while an adjusting means 320 for adjusting the rotation of the base plate 303 is provided on the base plate 303 at a position remote from the shaft 302. The adjusting means 320 includes a support frame 321 having a U-shaped cross section and mounted on the upper edge of the frame 300, a control shaft 323 rotatably mounted on the support frame 321 and having a threaded portion 322 surrounded at its one end by side walls of said support frame 321, and having an adjusting knob K2 provided at the other upper end of the control shaft 323 so as to extend outwardly from the surface of the control panel P as shown in FIGS. 24 and 28. A nut 325 threaded into the threaded portion 322 of the control shaft 323 and secured to a shaped connector 326 having an L-shaped cross section and which is pivotally connected to the base plate 303 on the side of the frame 300 on which the base plate 303 is positioned by a pin 327. The base plate 303 has an opening 328 therein having a diameter larger than that of the opening 301 in the frame 300 and located at a position facing said opening 301. A lens mounting plate 330 having a sector shape is rotatably mounted on the base plate 303 by a shaft 329 secured to the base plate 303 and extending in a direction parallel to the optical axis X. The lens mounting plate 330 has the projecting lens assembly 23B including projection lenses 23Ba and 23Bb of different magnifications releasably mounted thereon in positions to be brought into alignment with the openings 301 and 328 upon rotation of the lens mounting plate 330, and each of the projecting lenses 23Ba and 23Bb is so arranged to have one end face, contact the base plate 303 when mounted on the mounting plate 330, and is provided with a focussing gear 332 or 333 around the peripheral portion thereof for adjusting the focus of the lens. In the lens mounting plate 330 at a position between the projecting lenses 23Ba and 23Bb and the shaft 329, there is formed an arcuate groove 334, and the mounting plate 330 is urged toward the base plate 303 by urging means constituted by a pin 335 secured at its one end to the base plate 303 and extending through the arcuate groove 334, a washer 336 provided at the other end of the pin 335, another washer movably fitted onto a portion of the pin 335 extending through the groove 334 and a spring 338 disposed between the washers 336 and 337. On the outer peripheral edge of the lens mounting plate 330 there is provided a plate spring 339 for further urging the lens mounting plate 330 toward the base plate 303. The washer 337 and the plate spring 339 frictionally contact the lens mounting plate 330 respectively. Furthermore, on the base plate 303 at a position on one side of the lens mounting plate 330, there is provided a projection lens change-over portion 340 for substituting one of the projecting lenses 23Ba and 23Bb for the other by rotation of the lens mounting plate 330. The change-over means 340 includes a lever 342 having an L-shaped cross section rotatably supported on a pin 341 secured to the base plate 303, and two stops 343 and 344 adjustably mounted on the base plate 303 by screws extending through elongated openings formed therein for restricting the pivotal movement of the lever 342. For urging the lever 342 toward the stops 343 and 344 for fixing the end portions of the pivotal movement of the lever 342, a known click mechanism 345 is provided on the base plate 303. On the bent portion 346 of the lever 342, there is rotatably mounted a control shaft 347 having at its one end an adjusting knob K3 which projects from the control panel P at a position higher than the adjusting knob K2 as shown in FIGS. 24 and 28, and at the other end of the shaft 347 extending through the bent portion 346, is provided a threaded portion 349 which engages a not 350 secured to a sliding plate 351. The sliding plate 351 is guided in its movement by pins 353 on lever 342 and extending through elongated openings 352 formed in plate 35, in a direction parallel to the control shaft 347, and a spring (not shown) is disposed between the pins 353 and sliding plate 351 and a lever 355 is further pivotally connected at its one end to the sliding plate 351 by a pin 354, and also pivotally connected at its other end to the lens mounting plate 330 by a pin 356. By the above arrangement, when the projecting lens 23B*a* is located at a projecting position L aligned with the openings 301 and 328, the image on the film in the aperture card 2 in the carrier 1 is illuminated by the light source (not shown here), and is projected onto the observation screen 32 through the projecting lens 23B*a* via the reflecting mirrors 30B and 31B. In the above case, if part of the image projected toward the screen 32 is off the screen 32, either the adjusting knob K2 or K4 is rotated depending on the direction of the deviation of the projected image. More specifically, if the projected image is off the screen 32 in its vertical direction, the adjusting knob K2 is rotated for adjustment. Since the rotation of the knob K2 is transmitted to the threaded portion 322 of the control shaft 323, the nut 325 engaged with the threaded portion 322 is moved toward the control shaft 323. By the above movement of the nut 325, the shaped connector 326 causes the base plate 303 to move, but since the base plate 303 is pivoted on the shaft 302 as described earlier, it is rotated about the shaft 302. The rotation of the base plate 303 also causes the rotation of the projecting lens 23B*a* on the base plate 303 about the shaft 302. In the above case, since the amount of rotation of the base plate 303 is small, it may be regarded that the projecting lens 23B*a* moves vertically in a straight line in FIG. 26. When the projecting lens 23B*a* is moved vertically in FIG. 26, the projected image of the film in the aperture card 2 moves vertically on the screen 32. In the manner as described above, the projected image off the observation screen 32 in the vertical direction can be brought correctly onto the screen 32 by rotation of the adjusting knob K2.

On the other hand, if the projected image is of the screen 32 laterally, the adjusting knob K3 is rotated. The rotation of the knob K3 is transmitted to the threaded portion 349 of the control shaft 347 to move the nut 350 engaged therewith toward the shaft 347. By the above movement of the nut 350, the sliding plate 351 is also shafted toward the shaft 347, and causes the lens mounting plate 330 to rotate about the shaft 329 through the lever 355 pivotally connected to the sliding plate 351. Although the rotation of the lens mounting plate 330 also causes the projection lens 23B*a* to rotate, the amount of rotation is so small the movement may be regarded as a linear movement. In other words, the projecting lens 23B*a* moves laterally in a substantially straight line in FIG. 26. In the manner as described above, the projected image on the film in the aperture card 2 which is laterally off the screen 32 is brought correctly onto the screen 32 by the rotation of the adjusting knob K3. If the projected image is off the screen both vertically and laterally, the adjusting knobs K2 and K3 are properly rotated to bring the image correctly onto the observation screen 32.

The change-over from one of the projecting lenses 23B*a* and 23B*b* to the other will be described hereinbelow.

Figure 29:
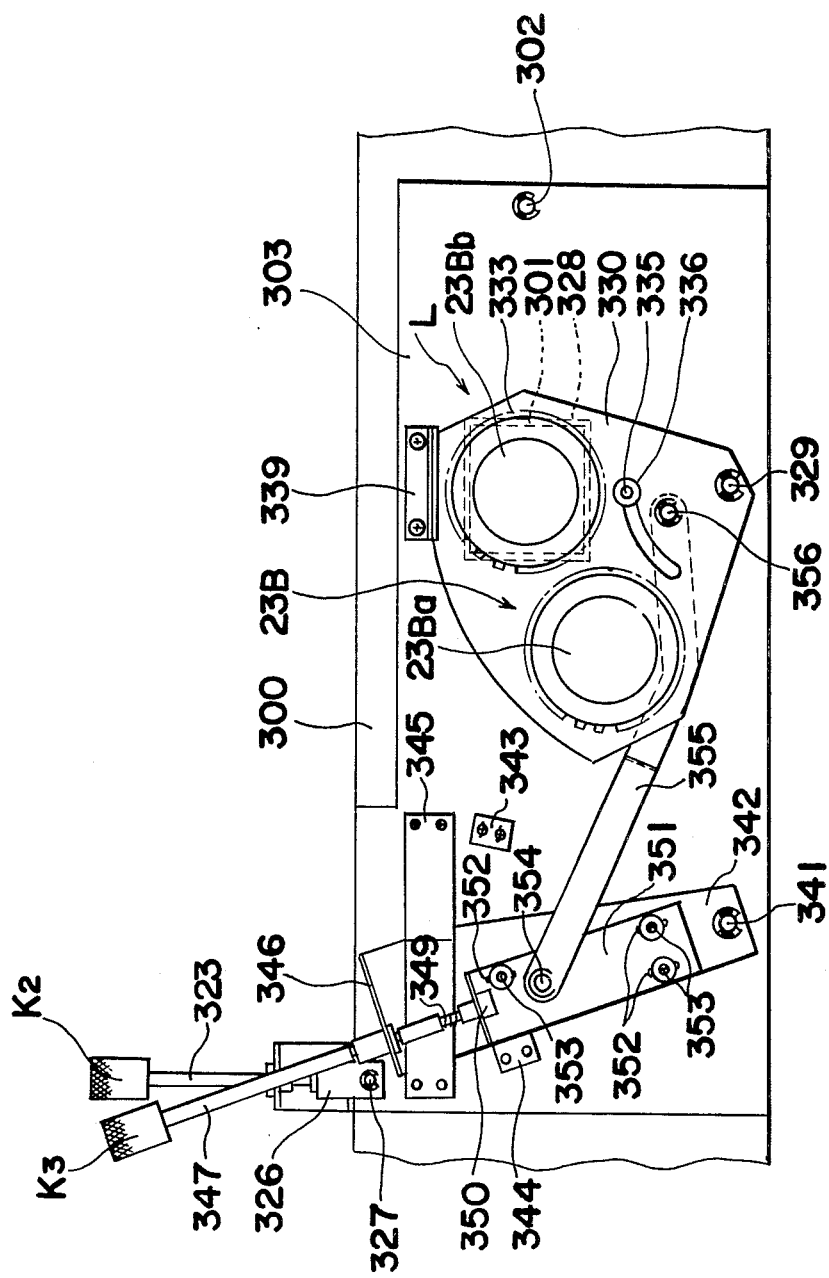
FIG. 29 is a view similar to FIG. 26 for explaining the functioning thereof.

For the change-over from the projecting lens 23B*a* to the lens 23B*b*, when the adjusting knob K3 is moved or inclined rightward in FIG. 24, i.e. toward the left in FIG. 26, the lever 342 is rotated about the pin 341 until it contacts the stop 344. As the lever 342 rotates, the sliding plate 351 on the lever 342 is simultaneously rotated therewith so as to rotate the lens mounting plate 330 through the lever 355. Following the above rotation, the projecting lens 23B*b* moves to the projecting position L as shown in FIG. 29 for projection of the image on the film in the aperture card 2 onto the screen 32. In the above case, if part of the projected image is off the screen 32 in the vertical direction, the adjusting knob K2 is rotated in a manner similar to that described earlier to move the projection lens 23B*b* vertically for bringing the deviated image correctly onto the screen 32.

Similarly, when the projected image on the film in the aperture card 2 is off the screen 32 laterally, the adjusting knob K3 in the inclined state is turned to move the sliding plate 351 for rotating the lens mounting plate 330 about the shaft 329 through the lever 355. Although the projecting lens 23B*b* is also rotated together with the lens mounting plate 330 by the above rotation, the lens 23B*b* may be regarded as moving laterally in a straight line in FIG. 29, since the amount of the rotation is trivial. By the above operation, the projected image which is off the screen 32 in the lateral direction is laterally shifted by the rotation of the adjusting knob K3 so as to be brought correctly onto the position of the screen 32. If the projected image is deviated both vertically and laterally with respect to the screen 32, the two adjusting knobs K2 and K3 are suitably rotated to bring the projected image onto the screen 32.

Furthermore, for changing from the projecting lens 23B*b* back to lens 23B*a*, the adjusting knob K3 is moved from the inclined state in FIG. 29 to the erected state as shown in FIG. 26 in the reverse way to that for the change-over from the projection lens 23B*a* to lens 23B*b*.

Figure 30:
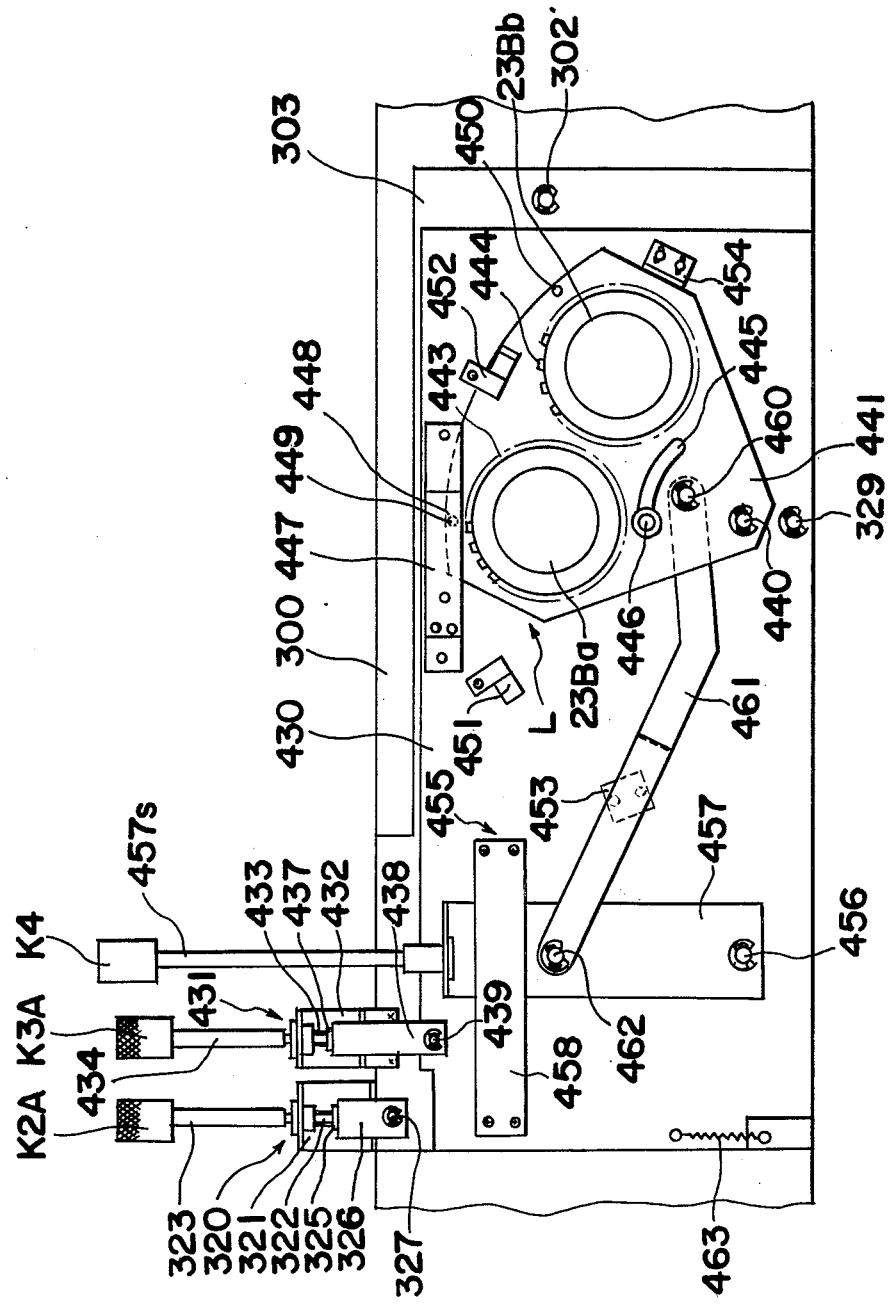
FIG. 30 is a view similar to FIG. 26, which particularly shows a modification thereof.
Figure 31:
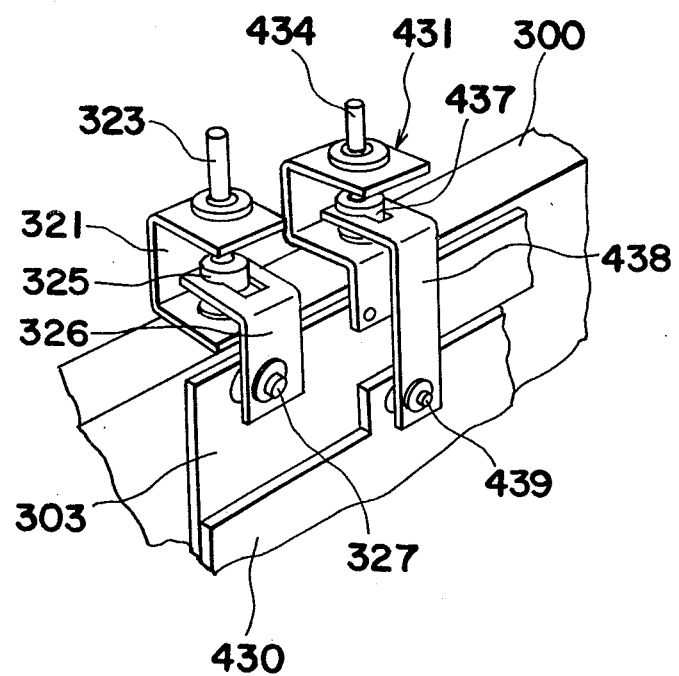
FIG. 31 is a fragmentary perspective view, showing, on an enlarged scale, the main portion of the arrangement of FIG. 30.

Referring to FIGS. 30 and 31, there is shown a further modification of the projecting lens adjusting means employed in the reader-printer GB of FIGS. 24 and 25. In this modification the lens change-over means and adjusting means are separately provided in the manner as described hereinbelow.

In the modified arrangement of FIGS. 30 and 31, a further base plate 430 is rotatably provided on the shaft 329 extending from the base plate 303 in a direction parallel to the optical axis. The base plate 430 is provided with an opening (not shown) in a position corresponding to the opening 301 in the base plate 303 and a further adjusting means 431 positioned to one side of the adjusting means 320.

The adjusting means 431 includes a support frame 432 provided on the base plate 303, a control shaft 434 rotatably supported by the support frame 432 and having a threaded portion 433 at its one end surrounded by the support frame 432 and a knob K3A provided at its other upper end. Additionally, a nut 437 rotatably threaded onto the threaded portion 433 of the shaft 431 is connected to a shaped connector 438 which is rotatably mounted on the base plate 430 by a pin 439. A support shaft 440 extends outwardly from the base plate 430 in a direction parallel to the optical axis, and a lens mounting plate 441 having sector shape is rotatably supported on the shaft 440.

The lens mounting plate 441 has projecting lens 23B*a* and 23B*b* of different magnifications releasably mounted thereon in positions for being brought into alignment with the opening of the frame 300 upon rotation of the lens mounting plate 441, and each of the projecting lenses 23B*a* and 23B*b* is positioned with one end face contacting the base plate 430 when mounted on the mounting plate 441, and each is provided with a focussing gear 443 or 444 around the peripheral portion thereof for adjusting the focus thereof. In the lens mounting plate 441 at a position between the projecting lenses 23B*a* and 23B*b* and the shaft 329, there is formed an arcuate groove 445 in a manner similar to the arrangement of FIG. 26, and the mounting plate 441 is urged toward the base plate 430 by a pin 446 secured at its one end to the base plate 430 and extending through the arcuate groove 445 and washers and a spring (not shown) on the end of the pin 446. On the other peripheral edge of the lens mounting plate 441, two openings 449 and 450 are formed and a plate spring 447 and a ball 448 are provided on the base plate 430 for forming a click stop means for positioning the projecting lens 23B*a* and 23B*b* when they are brought into the projecting position L. The base plate 430 is further provided with plate springs 451 and 452 for pressing the outer peripheral edge of the lens mounting plate 441 against the base plate 430 and also with stops 453 and 454 for restricting the rotation of the lens mounting plate 441. On the base plate 430 in a position to the side of the lens mounting plate 441, there is provided a change-over means 455 for changing-over the projecting lenses 23B*a* and 23B*b* by rotation of the mounting plate 441. The change-over means 455 generally includes a lever 457 rotatably supported by a pin 456 provided on the base plate 430, a restricting plate 458 for depressing the lever 457 toward the base plate 430, and a knob K4 coupled to the lever 457 by a shaft 457*s*. A lever 461 pivotally connected at its one end to the lens mounting plate 441 by a pin 460 is also pivotally connected at its other end to the lever 457 by a pin 462. Additionally, a spring 463 is connected between the base plates 303 and 430 for urging the base plate 430 in a counterclockwise direction relative to plate 303.

The operation of the foregoing modified arrangement of FIGS. 30 and 31 will be described hereinbelow.

Firstly, when the projecting lens 23B*a* is in the projecting position L, if the projected image is off the screen 32 vertically, the adjusting knob K2A is rotated. The rotation of the knob K2A causes the nut 325 engaging the threaded portion 322 of the shaft 323 to move vertically, with consequent rotation of the base plate 303 about the shaft 302. By the rotation of the base plate 303, the projecting lens 23B*a* is also rotated together with the base plate 303 about the shaft 302. In the above case, since the amount of rotation of the base plate 303 is small, it may be considered that the projecting lens 23B*a* moves vertically in a straight line in FIG. 30. Since the projected image moves vertically on the screen 32 following the vertical movement of the projecting lens 23B*a*, the portion of the projected image which is off the screen 32 in the vertical direction can be correctly brought onto the screen 32 by the rotation of the knob K2A.

On the other hand, if the projected image is off the screen 32 in the lateral direction, the adjusting knob K3A is rotated. The rotation of the knob K3A causes the nut 437 engaging the threaded portion 437 of the shaft 434 to move in the axial direction of the shaft 434, with consequent rotation of the base plate 430 and also the projecting lens 23B*a* about the shaft 329. In the above case, since the amount of rotation of the base plate 430 small, the projecting lens 23B*a* may be considered as moving laterally in a straight line in FIG. 30. The lateral movement of the projecting lens 23B*a* causes the projected image on the screen 32 to move laterally, and thus, part of the projected image which is off of the screen 32 in the lateral direction can be brought onto the screen 32 by rotation of the adjusting knob K3A.

If the projected image is deviated from the observation screen 32 both vertically and laterally, adjustments are made by the adjusting knobs K2A and K3A.

For the change-over from the projecting lens 23B*a* to the lens 23B*b*, when the change-over knob K4 is moved leftward in FIG. 30, the lever 457 rotates about the pin 456 for causing the lens mounting plate 441 to rotate by the movement of the lever 461. The rotational movement of the lens mounting plate 441 is stopped upon entry of the click ball 448 into the opening 450 of the plate 441 and contact of said plate 441 with the stop 453, and the projecting lens 23B*b* is shifted into the projecting position L. If the image projected through the projecting lens 23B*b* thus shifted is off the screen 32, the adjusting knob K2A or K3A or both are suitably rotated in a manner similar to that for adjusting the projecting lens 23B*a* for bringing the portion of the image correctly onto the screen 32.

For the change-over of the projecting lens 23B*b* back to the projecting lens 23B*a* again, by moving the change-over knob K4 rightward in FIG. 30, the lens mounting plate 441 is rotated until the click ball 448 enters the opening 449 of the lens mounting plate 441, and the plate 441 contacts the stop 454, and thus, the projecting lens 23B*a* is positioned at the projecting position L.

When the lens change-over means and adjusting means are provided independently as in the foregoing arrangement of FIGS. 30 and 31, the lens mounting portion can be positively fixed so as to be unaffected by vibrations, etc. affecting, for example, the whole reader-printer, with consequent elimination of turbulence, blur and the like in the copied images.

Moreover, in the arrangement according to the present invention as described above, since the image projected on the screen is moved by causing the projection lenses to move with respect to the image on the film in the stationary state, a similar effect as in the case where the film image is moved with respect to the stationary projecting lens can be achieved.

It is to be noted here that although the projecting lenses in the foregoing arrangements actually carry out an arcuate motion, the amount of movement thereof, which is equivalent to a value obtained by dividing the amount of shifting of the image projected on the screen by the magnification of the projecting lens, is so small that the movement of the projecting lens may be regarded as being a linear motion in actual practice.

It should also be noted that although the present invention has been mainly described with reference to a microfilm reader-printer in the foregoing embodiments, the concept of the present invention is not limited in its application to microfilm readers or microfilm reader-printers alone, but may readily be applied to any other apparatus such as copying apparatuses and the like requiring the arrangement of this kind, and also that the number of the projecting lenses described as two in the foregoing embodiments may of course be decreased or increased as desired and needed.

As is clear from the foregoing description, in the arrangements of FIGS. 24 through 31 including the first shifting means rotatably supported by a shaft parallel to the projecting optical axis, the first adjusting means for adjusting the rotation of the first shifting means, the second shifting means having the projecting lenses thereon and rotatably supported by a shaft proveded on the first shifting means and extending in a direction parallel to the optical axis, and the second adjusting means for adjusting the rotation of the second shifting means, the projected image can be moved while the film is held stationary irrespective of the arrangements for holding the film, and the construction of the means for carrying out the adjustment can be simplified.

Moreover, since the second shifting means is equipped with a plurality of projecting lenses, and the second adjusting means also serve for the change-over of the plurality of projecting lenses, the change-over and adjustments of the projecting lenses can be quickly and readily effected in an efficient manner.

Although the present invention has been fully described by way of example with reference to the accompanying drawings, it is to be noted that barious changes and modifications will be apparent to those skilled in the art. Therefore, unless otherwise such changes and modifications depart from the scope of the present invention, they should be construed as being included therein.

What is claimed is:

1. A reading and printing apparatus operable as a reader for projecting image information contained on a film onto an observation screen and as a printer for scanning and projecting said image information onto a photosensitive member through optical means, said reading and printing apparatus comprising: carrier means for holding said film in a flat state, first positioning means including a first positioning member for contacting and positioning said carrier means at a screen projecting position with the central portion of the image on said film aligned with the optical axis of said optical means so as to project said image information on said film onto the observation screen during the operation as a reader, second positioning means including a plurality of selectively operable second positioning members for selectively contacting and positioning said carrier means at a scanning starting position for scanning and projecting said image information on said film onto the photosensitive member during the operation as a printer, and scanning means for causing said carrier means to scan in one direction from said scanning starting position, return spring means connected to said carrier means for urging said carrier means in the other direction for returning said carrier means to said scanning starting position, said first positioning member and said plurality of selectively operable second positioning members each having fine adjusting means for precisely adjusting the position thereof with respect to said carrier means, each of said first positioning member and said plurality of selectively operable second positioning members having a set of a stop plate member and a stop adjusting plate member placed one upon the other and a screw member coupling said plate members and serving for producing fine adjusting relative movement therebetween, a shaft member on which said sets are mounted for simultaneous rotation about the axis of said shaft member, each set of said stop plate member and said stop adjusting plate member having shock absorbing spring means connected to one end and stop spring means connected to the other end for being normally urged in one direction about said shaft member, a contact member mounted on said carrier means, a solenoid means operatively associated with said first positioning member for selectively moving said first positioning member into or out of the path of movement of said contact member mounted as said carrier means is scanned in said one direction by said scanning means, operating means coupled to said plurality of selectively operable second positioning member for selectively bringing said second positioning member into or out of the path of movement of said contact member on said carrier means as said carrier means is scanned in said one direction by said scanning means, said operating means including stop cam members each having a pin member on the peripheral portion and fixedly mounted on said rotatable shaft member in positions corresponding to said second positioning members, said pin members on said cam members being offset circumferentially relative to each other so that upon contact of said second stop members by the peripheral edges of said cam members by the urging force of said stop spring means, said second positioning members are spaced from said path of movement of said contact member of said carrier means, and said second positioning members are moved into said path of movement of said contact member of said carrier means again for contact with said contact member by the urging force of said stop spring means upon contact of any one of said cam members with a corresponding one of said second stop members, the spring force of said shock absorbing spring means of said first positioning member and said second positioning member being larger than that of said return spring means of said carrier means, and a threaded bolt member connected to each of said shock absorbing springs for adjusting the spring force thereof.

2. A reading and printing apparatus having optical means, an observation screen and a photosensitive member and operable as a reader for projecting image information contained on a film onto the observation screen and as a printer for scanning and projecting said image information onto the photosensitive member by the optical means, said reading and printing apparatus comprising:

carrier means movably mounted on said apparatus for holding said film in a flat state;

scanning means connected to said carrier means for moving said carrier means along a scanning path;

first positioning means including a first positioning member mounted on said apparatus for movement into or out of said scanning path for positioning said carrier means at a screen projecting position with a central portion of said image information on said film held by said carrier means being aligned with the optical axis of said optical means for projecting said image information on said film onto said observation screen during the operation as a reader;

a first film adjusting means connected to said first positioning member for adjusting said first positioning member in the direction of said scanning path;

second positioning means including a plurality of selectively operable second positioning members mounted on said apparatus for movement into or out of said scanning path for positioning said carrier at a scanning start position from which said scanning means starts the scanning movement for projecting said image information on said film onto said photosensitive member during the operation as a printer; and second fine adjusting means connected to said second positioning means for adjusting each of said second positioning adjusting members respectively in the direction of said scanning path.

3. A reading and printing apparatus as claimed in claim 2, wherein each of said first positioning member and said plurality of second positioning members has a set of stop plate member and a stop adjusting plate member placed one upon the other and a screw member coupling said members and serving for producing fine adjusting relative movement between said stop plate member and said stop adjusting plate member, a shaft member on which said sets are mounted for simultaneous rotation around the axis of said shaft member, each set of said stop plate member and said stop adjusting olate member having shock absorbing spring means connected to one end and stop spring means connected to the other end for normally urging said set in one direction around said shaft member.

4. A reading and printing apparatus as claimed in claim 3, further comprising a solenoid means operatively associated with said first positioning member for selectively moving said first positioning member into or out of said scanning path of said carrier means.

5. A reading and printing apparatus as claimed in claim 3, further comprising operating means coupled to said plurality of second positioning members for selectively moving said second positioning members into or out of said scanning path of said carrier means, said operating means including stop cam members fixedly mounted on said shaft member in positions corresponding to said second positioning members, said cam members being offset circumferentially relative to each other so that upon contact of said second positioning members with said cam members by the urging force of said stop spring means, said second positioning members are spaced from said scanning path, and said second positioning members are moved into said scanning path for contact with said carrier means by the urging force of said stop spring means upon contact of any one of said cam members with a corresponding one of said second stop members.

6. A reading and printing apparatus having optical means, an observation screen and a photosensitive member and operable as a reader for projecting image information contained on a film onto the observation screen and as a printer for scanning and projecting said image information onto the photosensitive member by the optical means, said reading and printing apparatus comprising:

carrier means movably mounted on said apparatus for holding said film in a flat state;

scanning means connected to said carrier means for moving said carrier means along a scanning path, said scanning means having a driving mechanism for moving said carrier means in a scanning direction along said scanning path and a returning member for returning said carrier means along said scanning path in a direction opposite to said scanning direction;

first positioning means including a first positioning member mounted on said apparatus for movement into and out of said scanning path and means for moving said first positioning member into said scanning path when said carrier means is returned by said returning member along said scanning path for positioning said carrier means at a screen projecting position at which a central portion of said information on said film held by said carrier means is on the optical axis of said optical means so that said image information on said film is projected onto said observation screen for enabling said apparatus to operate as a reader;

first fine adjusting means connected to said first positioning means for adjusting said first positioning member in the direction of said scanning path;

second positioning means including a plurality of selectively operable second positioning members movably mounted on said apparatus for movement into or out of said scanning path, and means for moving a selected one of said second positioning members into said scanning path when said carrier means is returned by said returning member along said scanning path for positioning said carrier means at a scanning start position from which said carrier means is moved in the scanning direction by said driving mechanism to scan and project said image information on said film onto said photosensitive member for enabling the apparatus to operate as a printer; and second fine adjusting means connected to said second positioning means for adjusting the respective second positioning members in the direction of said scanning path.

7. A reading and printing apparatus as claimed in claim 6, wherein each of said first positioning member and said plurality of second positioning members has a set of a stop plate member and a stop adjusting plate member placed one upon the other and a screw member coupling said members and serving for producing fine adjusting relative movement between said stop plate member and stop adjusting plate member, a shaft member on which said sets are mounted for simultaneous rotation around the axis of said shaft member, each set of said stop plate member and said stop adjusting plate member having shock absorbing spring means connected to one end and stop spring means connected to the other end for normally urging said set in one direction around said shaft member.

8. A reading and printing apparatus as claimed in claim 7, wherein the spring force of said shock absorbing spring means is larger than the returning force of said returning member, and a threaded bolt member connected to each of said shock absorbing spring means for adjusting the spring force thereof.

9. A reading and printing apparatus having optical means, an observation screen and a photosensitive member and operable as a reader for projecting image information contained on a film onto the observation screen and operable as a printer for scanning and projecting said image information onto the photosensitive member by the optical means, said reading and printing apparatus comprising:

carrier means for holding said film in a flat state and movably mounted on said apparatus;

scanning means for moving said carrier means in a scanning direction along a scanning path;

first positioning means for positioning said carrier means at screen projecting position at which the central portion of the image on said film is aligned with the optical axis of said optical means so as to project said image information on said film onto the observation screen for enabling operation of the apparatus as a reader;

second positioning means for positioning said carrier means at a plurality of scanning start positions corresponding to a plurality of image information sizes on the film on which the image information is contained to enable the start of scanning movement of said carrier means from the scanning start position corresponding to the size of the information on the film which is positioned in the carrier means;

said photosensitive member being a drum on which an electrostatic latent image is formed by the projection thereon of said image information;

paper feeding means for feeding copy paper to said photosensitive member;

signal generating means for generating a signal corresponding to the length of copy paper corresponding to the size of the image information on the film in said carrier means;

cutting means connected to said signal generating means for cutting said copy paper fed to said photosensitive member in response to said signal from said signal generating means;

detecting means along the path of the paper fed by said paper feeding means between said cutting means and said photosensitive member for detecting the passage of the front and rear ends of a piece of copy paper cut by said cutting means and generating a detecting signal when said detecting means detects the front end of said piece of copy paper and connected to said scanning means for supplying said front end signal thereto for actuating said scanning means for moving said carrier means from the selected scanning srart position, and generating a further detecting signal when the rear end of said cut piece of copy paper arrives at said detecting means and supplying it to said scanning means for deactivating said scanning means to terminate the movement of said carrier means in the scanning direction.

10. A reading and printing apparatus as claimed in claim 9, wherein said second positioning means comprises a plurality of second positioning members corresponding to the plurality of sizes of information on said film, and said signal generating means includes a plurality of signal generating members corresponding to the plurality of sizes of information on said film for generating signals for cutting lengths of copy paper corresponding to the respective sizes of information on said film.

11. A reading and printing apparatus as claimed in claim 9, wherein said signal generating means comprises a movable member connected to said scanning means and a plurality of selectively actuable detecting members for detecting the movement of said movable member and generating signals for actuating said cutting means to cut a length of copy paper corresponding to the size of the information on said film in said carrier means.

* * * * *